US008834270B2

(12) United States Patent
Okada et al.

(10) Patent No.: US 8,834,270 B2
(45) Date of Patent: Sep. 16, 2014

(54) GAMING MACHINE

(75) Inventors: Kazuo Okada, Koto-ku (JP); Masatsugu Kobayashi, Koto-ku (JP); Toshiya Ogawa, Koto-ku (JP); Mayumi Takeda, Koto-ku (JP)

(73) Assignee: Universal Entertainment Corporation, Tokyo (JP)

( * ) Notice: Subject to any disclaimer, the term of this patent is extended or adjusted under 35 U.S.C. 154(b) by 778 days.

(21) Appl. No.: 11/229,715

(22) Filed: Sep. 20, 2005

(65) Prior Publication Data

US 2006/0068901 A1 Mar. 30, 2006

(30) Foreign Application Priority Data

Sep. 29, 2004 (JP) ................................ 2004-284772
Sep. 29, 2004 (JP) ................................ 2004-284774
Aug. 3, 2005 (JP) ................................ 2005-225395
Aug. 3, 2005 (JP) ................................ 2005-225423

(51) Int. Cl.
*A63F 9/24* (2006.01)
*A63F 13/00* (2014.01)
*G07F 17/32* (2006.01)

(52) U.S. Cl.
CPC ............ *G07F 17/3262* (2013.01); *G07F 17/32* (2013.01)
USPC .................... 463/35; 463/20; 463/25; 463/36

(58) Field of Classification Search
USPC ........................................................ 463/20
See application file for complete search history.

(56) References Cited

U.S. PATENT DOCUMENTS 5,393,061 A * 2/1995 Manship et al. ................ 463/20
5,788,574 A 8/1998 Ornstein et al.
6,004,208 A * 12/1999 Takemoto et al. ............. 463/20
6,089,976 A 7/2000 Schneider et al.
6,159,098 A 12/2000 Slomiany et al.
6,227,970 B1 * 5/2001 Shimizu et al. ................ 463/20
6,293,866 B1 * 9/2001 Walker et al. .................. 463/20
6,347,996 B1 * 2/2002 Gilmore et al. ................ 463/17
6,375,570 B1 * 4/2002 Poole ............................. 463/31
6,416,411 B1 * 7/2002 Tsukahara ...................... 463/35
6,506,116 B1 1/2003 Sunaga et al.
6,604,740 B1 * 8/2003 Singer et al. ................. 273/292

(Continued)

FOREIGN PATENT DOCUMENTS

DE 32 42 890 A1 5/1984
EP 0 740 947 A1 11/1996

(Continued)

OTHER PUBLICATIONS

Extended European Search Report issued Mar. 21, 2006, in European Patent Application No. 05256045.5.

(Continued)

*Primary Examiner* — Steven J Hylinski
(74) *Attorney, Agent, or Firm* — Lexyoume IP Meister, PLLC

(57) ABSTRACT

A gaming machine includes a bet rate setting device with which a value of game medium per unit bet is set as a bet rate, a setting sound output device outputting a setting sound when the bet rate is set by the bet rate setting device, and a setting sound control device controlling the setting sound, to be outputted from the setting sound output device, depending on the bet rate set by the bet rate setting device.

9 Claims, 20 Drawing Sheets

353

| BET RATE | 5-CENT | 10-CENT | 25-CENT | 50-CENT | ONE DOLLAR |
|---|---|---|---|---|---|
| SETTING SOUND | FIRST SETTING SOUND | SECOND SETTING SOUND | THIRD SETTING SOUND | FOURTH SETTING SOUND | FIFTH SETTING SOUND |

(56) References Cited

U.S. PATENT DOCUMENTS

| | | | | |
|---|---|---|---|---|
| 6,652,381 | B1 * | 11/2003 | Ungaro | 463/29 |
| 6,656,046 | B1 | 12/2003 | Yoseloff et al. | |
| 6,685,559 | B2 * | 2/2004 | Luciano et al. | 463/16 |
| 7,311,601 | B2 * | 12/2007 | Anderson et al. | 463/20 |
| 7,666,098 | B2 * | 2/2010 | Hecht et al. | 463/35 |
| 2003/0027629 | A1 * | 2/2003 | Pimienta | 463/25 |
| 2003/0064804 | A1 | 4/2003 | Wilder et al. | |
| 2003/0195031 | A1 * | 10/2003 | O'Donovan et al. | 463/16 |
| 2003/0199295 | A1 * | 10/2003 | Vancura | 463/16 |
| 2003/0216173 | A1 * | 11/2003 | Gauselmann | 463/30 |
| 2003/0216174 | A1 * | 11/2003 | Gauselmann | 463/30 |
| 2004/0147307 | A1 | 7/2004 | Joshi | |
| 2006/0052164 | A1 * | 3/2006 | Davis | 463/35 |

FOREIGN PATENT DOCUMENTS

| | | | |
|---|---|---|---|
| EP | 1 439 507 | A2 | 7/2004 |
| GB | 2 057 738 | A | 4/1981 |
| GB | 2 153 189 | A | 8/1985 |
| JP | 2002-355359 | | 12/2002 |
| JP | 2003-180921 | | 7/2003 |
| WO | WO 2004/024251 | A2 | 3/2004 |

OTHER PUBLICATIONS

Office Action issued Aug. 19, 2011, in Australian Patent Application No. 2005211594.

Office Action issued Jan. 11, 2011, in Australia Patent Application No. 2005211594.

* cited by examiner

FIG. 1
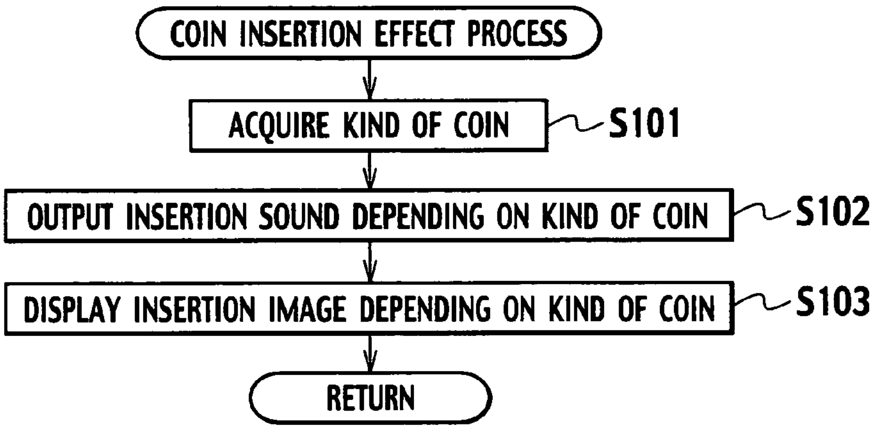
FIG. 2
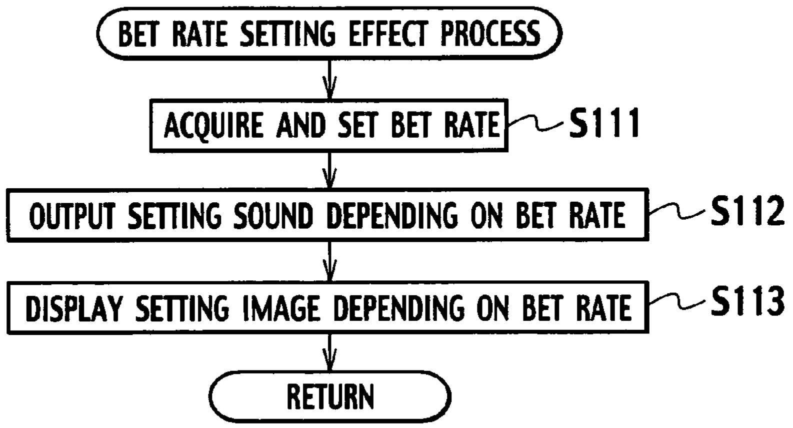
FIG. 3
351
| COIN | 5-CENT | 10-CENT | 25-CENT | 50-CENT | ONE DOLLAR |
|---|---|---|---|---|---|
| INSERTION SOUND | FIRST INSERTION SOUND | SECOND INSERTION SOUND | THIRD INSERTION SOUND | FOURTH INSERTION SOUND | FIFTH INSERTION SOUND |

FIG. 4

352

| COIN | 5-CENT | 10-CENT | 25-CENT | 50-CENT | ONE DOLLAR |
|---|---|---|---|---|---|
| INSERTION IMAGE | FIRST INSERTION IMAGE | SECOND INSERTION IMAGE | THIRD INSERTION IMAGE | FOURTH INSERTION IMAGE | FIFTH INSERTION IMAGE |

FIG. 5

353

| BET RATE | 5-CENT | 10-CENT | 25-CENT | 50-CENT | ONE DOLLAR |
|---|---|---|---|---|---|
| SETTING SOUND | FIRST SETTING SOUND | SECOND SETTING SOUND | THIRD SETTING SOUND | FOURTH SETTING SOUND | FIFTH SETTING SOUND |

FIG. 6

354

| BET RATE | 5-CENT | 10-CENT | 25-CENT | 50-CENT | ONE DOLLAR |
|---|---|---|---|---|---|
| SETTING IMAGE | FIRST SETTING IMAGE | SECOND SETTING IMAGE | THIRD SETTING IMAGE | FOURTH SETTING IMAGE | FIFTH SETTING IMAGE |

FIG. 12

101

| FIRST REEL BAND | |
|---|---|
| CODE No. | SYMBOL |
| 00 | J |
| 01 | Q |
| 02 | LOBSTER |
| 03 | J |
| 04 | Q |
| 05 | CRAB |
| 06 | A |
| 07 | WORM |
| 08 | K |
| 09 | FISH |
| 10 | PUNK |
| 11 | Q |
| 12 | SHARK |
| 13 | CRAB |
| 14 | K |
| 15 | A |
| 16 | OCTOPUS |
| 17 | J |
| 18 | Q |
| 19 | FISH |
| 20 | K |
| 21 | J |
| 22 | SARDINE |
| 23 | CRAB |
| 24 | J |
| 25 | WORM |
| 26 | Q |
| 27 | CRAB |
| 28 | A |
| 29 | FISH |

102

| SECOND REEL BAND | |
|---|---|
| CODE No. | SYMBOL |
| 00 | OCTOPUS |
| 01 | A |
| 02 | LOBSTER |
| 03 | OCTOPUS |
| 04 | K |
| 05 | J |
| 06 | FISH |
| 07 | WORM |
| 08 | J |
| 09 | CRAB |
| 10 | OCTOPUS |
| 11 | A |
| 12 | SARDINE |
| 13 | WORM |
| 14 | J |
| 15 | OCTOPUS |
| 16 | SHARK |
| 17 | J |
| 18 | OCTOPUS |
| 19 | CRAB |
| 20 | Q |
| 21 | PUNK |
| 22 | CRAB |
| 23 | OCTOPUS |
| 24 | J |
| 25 | WORM |
| 26 | CRAB |
| 27 | K |
| 28 | OCTOPUS |
| 29 | WORM |

103

| THIRD REEL BAND | |
|---|---|
| CODE No. | SYMBOL |
| 00 | A |
| 01 | K |
| 02 | LOBSTER |
| 03 | WORM |
| 04 | Q |
| 05 | LOBSTER |
| 06 | PUNK |
| 07 | A |
| 08 | J |
| 09 | SARDINE |
| 10 | A |
| 11 | Q |
| 12 | WORM |
| 13 | K |
| 14 | FISH |
| 15 | Q |
| 16 | CRAB |
| 17 | A |
| 18 | K |
| 19 | SHARK |
| 20 | Q |
| 21 | K |
| 22 | OCTOPUS |
| 23 | Q |
| 24 | A |
| 25 | WORM |
| 26 | J |
| 27 | Q |
| 28 | PUNK |
| 29 | K |

104

| FORTH REEL BAND | |
|---|---|
| CODE No. | SYMBOL |
| 00 | Q |
| 01 | J |
| 02 | LOBSTER |
| 03 | Q |
| 04 | K |
| 05 | LOBSTER |
| 06 | A |
| 07 | K |
| 08 | SARDINE |
| 09 | A |
| 10 | K |
| 11 | CRAB |
| 12 | PUNK |
| 13 | K |
| 14 | SHARK |
| 15 | WORM |
| 16 | A |
| 17 | OCTOPUS |
| 18 | FISH |
| 19 | K |
| 20 | WORM |
| 21 | PUNK |
| 22 | A |
| 23 | FISH |
| 24 | CRAB |
| 25 | K |
| 26 | Q |
| 27 | OCTOPUS |
| 28 | WORM |
| 29 | Q |

105

| FIFTH REEL BAND | |
|---|---|
| CODE No. | SYMBOL |
| 00 | J |
| 01 | A |
| 02 | LOBSTER |
| 03 | J |
| 04 | A |
| 05 | FISH |
| 06 | CRAB |
| 07 | PUNK |
| 08 | K |
| 09 | SARDINE |
| 10 | Q |
| 11 | CRAB |
| 12 | K |
| 13 | WORM |
| 14 | FISH |
| 15 | J |
| 16 | OCTOPUS |
| 17 | Q |
| 18 | WORM |
| 19 | J |
| 20 | Q |
| 21 | OCTOPUS |
| 22 | A |
| 23 | PUNK |
| 24 | WORM |
| 25 | Q |
| 26 | CRAB |
| 27 | PUNK |
| 28 | K |
| 29 | OCTOPUS |

FIG. 13

| | 2K | 3K | 4K | 5K | |
|---|---|---|---|---|---|
| LOBSTER | 10 | 320 | 2500 | 6000 | Left → Right |
| SHARK | 3 | 25 | 150 | 1000 | Left → Right |
| FISH | 2 | 15 | 120 | 500 | Left → Right |
| PUNK | 2 | 10 | 120 | 400 | Left → Right |
| OCTOPUS | 2 | 8 | 50 | 300 | Left → Right |
| CRAB | | 7 | 50 | 200 | Left → Right |
| WORM | | 6 | 40 | 150 | Left → Right |
| A | | 5 | 25 | 120 | Left → Right |
| K | | 5 | 25 | 120 | Left → Right |
| Q | | 5 | 20 | 100 | Left → Right |
| J | | 5 | 20 | 100 | Left → Right |
| SARDINE | 2 | 5 | 10 | 125 | SCATTER/Trigger |

FIG. 14

| CODE No. | RANDOM NUMBER VALUE |
|---|---|
| 00 | 0 |
| 01 | 1 |
| 02 | 2 |
| 03 | 3 |
| 04 | 4 |
| 05 | 5 |
| 06 | 6 |
| 07 | 7 |
| 08 | 8 |
| 09 | 9 |
| 10 | 10 |
| 11 | 11 |
| 12 | 12 |
| 13 | 13 |
| 14 | 14 |
| 15 | 15 |
| 16 | 16 |
| 17 | 17 |
| 18 | 18 |
| 19 | 19 |
| 20 | 20 |
| 21 | 21 |
| 22 | 22 |
| 23 | 23 |
| 24 | 24 |
| 25 | 25 |
| 26 | 26 |
| 27 | 27 |
| 28 | 28 |
| 29 | 29 |

FIG. 24

| CODE No. | RANDOM NUMBER VALUE |
|---|---|
| 0 | 0~539 |
| 1 | 540~1040 |
| 2 | 1041~1592 |
| 3 | 1593~2131 |
| 4 | 2132~2665 |
| 5 | 2666~3215 |
| 6 | 3216~3751 |
| 7 | 3752~4299 |
| 8 | 4300~4821 |
| 9 | 4822~5351 |
| 10 | 5352~5972 |
| 11 | 5973~6321 |
| 12 | 6322~6953 |
| 13 | 6954~7492 |
| 14 | 7493~8121 |
| 15 | 8122~8630 |
| 16 | 8631~9151 |
| 17 | 9152~9723 |
| 18 | 9724~10257 |
| 19 | 10258~10872 |
| 20 | 10873~11327 |
| 21 | 11328~11874 |
| 22 | 11875~12450 |
| 23 | 12451~13011 |
| 24 | 13012~13552 |
| 25 | 13553~14033 |
| 26 | 14034~14624 |
| 27 | 14625~15121 |
| 28 | 15122~15722 |
| 29 | 15723~16383 |

FIG. 25

123

| FIRST REEL BAND | |
|---|---|
| CODE No. | SYMBOL |
| 00 | J |
| 01 | Q |
| 02 | LOBSTER |
| 03 | J |
| 04 | Q |
| 05 | CRAB |
| 06 | A |
| 07 | WORM |
| 08 | K |
| 09 | FISH |
| 10 | PUNK |
| 11 | Q |
| 12 | SHARK |
| 13 | CRAB |
| 14 | K |
| 15 | A |
| 16 | OCTOPUS |
| 17 | J |
| 18 | Q |
| 19 | FISH |
| 20 | K |
| 21 | J |
| 22 | SARDINE |
| 23 | CRAB |
| 24 | J |
| 25 | WORM |
| 26 | Q |
| 27 | CRAB |
| 28 | A |
| 29 | FISH |

124

| SECOND REEL BAND | |
|---|---|
| CODE No. | SYMBOL |
| 00 | OCTOPUS |
| 01 | A |
| 02 | LOBSTER |
| 03 | OCTOPUS |
| 04 | K |
| 05 | J |
| 06 | FISH |
| 07 | WORM |
| 08 | J |
| 09 | CRAB |
| 10 | OCTOPUS |
| 11 | A |
| 12 | SARDINE |
| 13 | WORM |
| 14 | J |
| 15 | OCTOPUS |
| 16 | SHARK |
| 17 | J |
| 18 | OCTOPUS |
| 19 | CRAB |
| 20 | Q |
| 21 | PUNK |
| 22 | CRAB |
| 23 | OCTOPUS |
| 24 | J |
| 25 | WORM |
| 26 | CRAB |
| 27 | K |
| 28 | OCTOPUS |
| 29 | WORM |

125

| THIRD REEL BAND | |
|---|---|
| CODE No. | SYMBOL |
| 00 | A |
| 01 | K |
| 02 | LOBSTER |
| 03 | WORM |
| 04 | Q |
| 05 | LOBSTER |
| 06 | PUNK |
| 07 | A |
| 08 | J |
| 09 | SARDINE |
| 10 | A |
| 11 | Q |
| 12 | WORM |
| 13 | K |
| 14 | FISH |
| 15 | Q |
| 16 | CRAB |
| 17 | A |
| 18 | K |
| 19 | SHARK |
| 20 | Q |
| 21 | K |
| 22 | OCTOPUS |
| 23 | Q |
| 24 | A |
| 25 | WORM |
| 26 | J |
| 27 | Q |
| 28 | PUNK |
| 29 | K |

126

| FORTH REEL BAND | |
|---|---|
| CODE No. | SYMBOL |
| 00 | Q |
| 01 | J |
| 02 | LOBSTER |
| 03 | Q |
| 04 | K |
| 05 | LOBSTER |
| 06 | A |
| 07 | K |
| 08 | SARDINE |
| 09 | A |
| 10 | K |
| 11 | CRAB |
| 12 | PUNK |
| 13 | K |
| 14 | SHARK |
| 15 | WORM |
| 16 | A |
| 17 | OCTOPUS |
| 18 | FISH |
| 19 | K |
| 20 | WORM |
| 21 | PUNK |
| 22 | A |
| 23 | FISH |
| 24 | CRAB |
| 25 | K |
| 26 | Q |
| 27 | OCTOPUS |
| 28 | WORM |
| 29 | Q |

127

| FIFTH REEL BAND | |
|---|---|
| CODE No. | SYMBOL |
| 00 | J |
| 01 | A |
| 02 | LOBSTER |
| 03 | J |
| 04 | A |
| 05 | FISH |
| 06 | CRAB |
| 07 | PUNK |
| 08 | K |
| 09 | SARDINE |
| 10 | LOBSTER |
| 11 | CRAB |
| 12 | K |
| 13 | WORM |
| 14 | FISH |
| 15 | J |
| 16 | OCTOPUS |
| 17 | Q |
| 18 | WORM |
| 19 | J |
| 20 | Q |
| 21 | OCTOPUS |
| 22 | A |
| 23 | PUNK |
| 24 | WORM |
| 25 | Q |
| 26 | CRAB |
| 27 | PUNK |
| 28 | K |
| 29 | OCTOPUS |

GAMING MACHINE

CROSS REFERENCE TO RELATED APPLICATIONS

This application is based upon and claims the benefit of priority from the Japanese Patent Applications Nos. 2004-284772 and 2004-284774, filed on Sep. 29, 2004 and Nos. 2005-225395 and 2005-225423, filed on Aug. 3, 2005 in the Japanese Patent Office; the entire contents of which are incorporated herein by reference.

BACKGROUND OF THE INVENTION

1. Field of the Invention

The present invention relates to a gaming machine with which a bet rate, which is a value of coin per 1 BET, can be set.

2. Description of the Related Art

Gaming machines of the related art include a slot machine arranged to perform a notification effect on winning upon variation of a volume of a gaming sound. That is, as the winning occurs, an operation sound volume is varied to notify the winning every time a stop switch is actuated to stop reels, while when it is turned out that the winning is not determined, the operation sound volume is further varied in a subsequent stage giving notification that the wining is not yet determined (as disclosed in Japanese Patent Laid Open Publication No. 2002-355359 on pages 17 and 18 and in FIG. 10).

However, it has been not achieved to discriminate the bet rate with the sound.

Further, the gaming machines of the related art include a slot machine arranged to perform a notification effect on winning over a liquid crystal display device, or the like, provided on a front panel. Furthermore, with such a slot machine, after all the reels have been stopped, inserting a medal causes an insertion signal to be generated to make a start request for a subsequent game, enabling a player at his own discretion to close down a notification effect associated with the winning in mid-course thereof (as disclosed in Japanese Patent Laid Open Publication No. 2003-180921 on page 2).

However, it has been not achieved to discriminate the bet rate by closing the notification effect in mid-course thereof.

Therefore, the present invention has been completed with the above view in mind and has an object to provide a gaming machine that is able to discriminate a bet rate with a setting sound or a setting image.

BRIEF SUMMARY OF THE INVENTION

According to the first feature of the present invention, a gaming machine (for instance, a slot machine 1) comprises a bet rate setting device (for instance, a "BET RATE" button 301) with which a value of a currency for the number of unit bet is set as a bet rate, a setting sound output device (for instance, speaker 80) outputting a setting sound when the bet rate is set with the bet rate setting device, and a setting sound control device (for instance, a sound control CPU 312) controlling the setting sound, to be outputted from the setting sound output device, depending on the bet rate set with the bet rate setting device.

According to the second feature of the present invention, a gaming machine (for instance, a slot machine 1) comprises a bet rate setting device (for instance, a "BET RATE" button 301) with which a value of a currency for the number of unit bet is set as a bet rate, a setting image output device (for instance, upper liquid crystal display 3) outputting a setting image when the bet rate is set with the bet rate setting device, and a setting image control device (for instance, image control CPU 83) controlling the setting image, to be outputted from the setting image output device, depending on the bet rate set with the bet rate setting device.

Also, as used herein, the term "game medium" includes medal-shaped gaming media that include coins monetized from metal and alternative coins such as so-called gaming medals. Further, the term "game medium" includes "bills".

BRIEF DESCRIPTION OF THE DRAWINGS

FIG. 1 is a flowchart of a coin insertion effect process program.

FIG. 2 is a flowchart of a bet rate setting process program.

FIG. 3 is an illustrative view showing a coin insertion sound selection table.

FIG. 4 is an illustrative view showing a coin insertion image selection table.

FIG. 5 is an illustrative view showing a bet rate setting sound selection table.

FIG. 6 is an illustrative view showing a bet rate setting image selection table.

FIG. 12 is an illustrative view typically showing rows of symbols to be variably displayed over variable display devices in a base game.

FIG. 13 is an illustrative view showing winning combinations and associated awards.

FIG. 14 is an illustrative view showing a sortition table of stop and display symbols to be used when practicing the base game through the use of five variable display devices.

FIG. 24 is an illustrative view showing a sortition table for the stop and display symbols.

FIG. 25 is an illustrative view typically sowing rows of symbols to be variably displayed over the variable display devices during a bonus game.

DETAILED DESCRIPTION OF THE INVENTION

Figure 8:
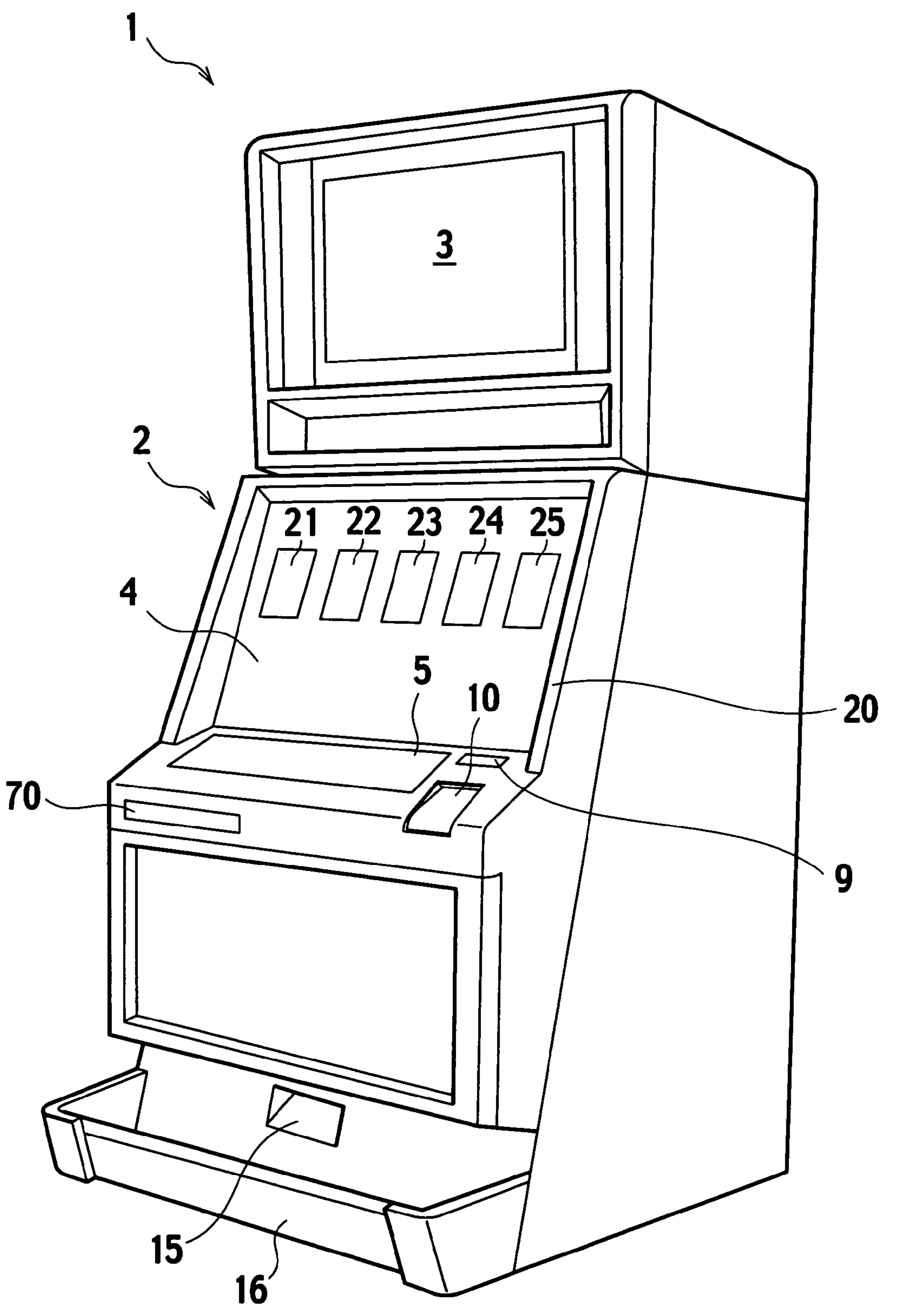
FIG. 8 is a perspective view of a slot machine.
Figure 9:
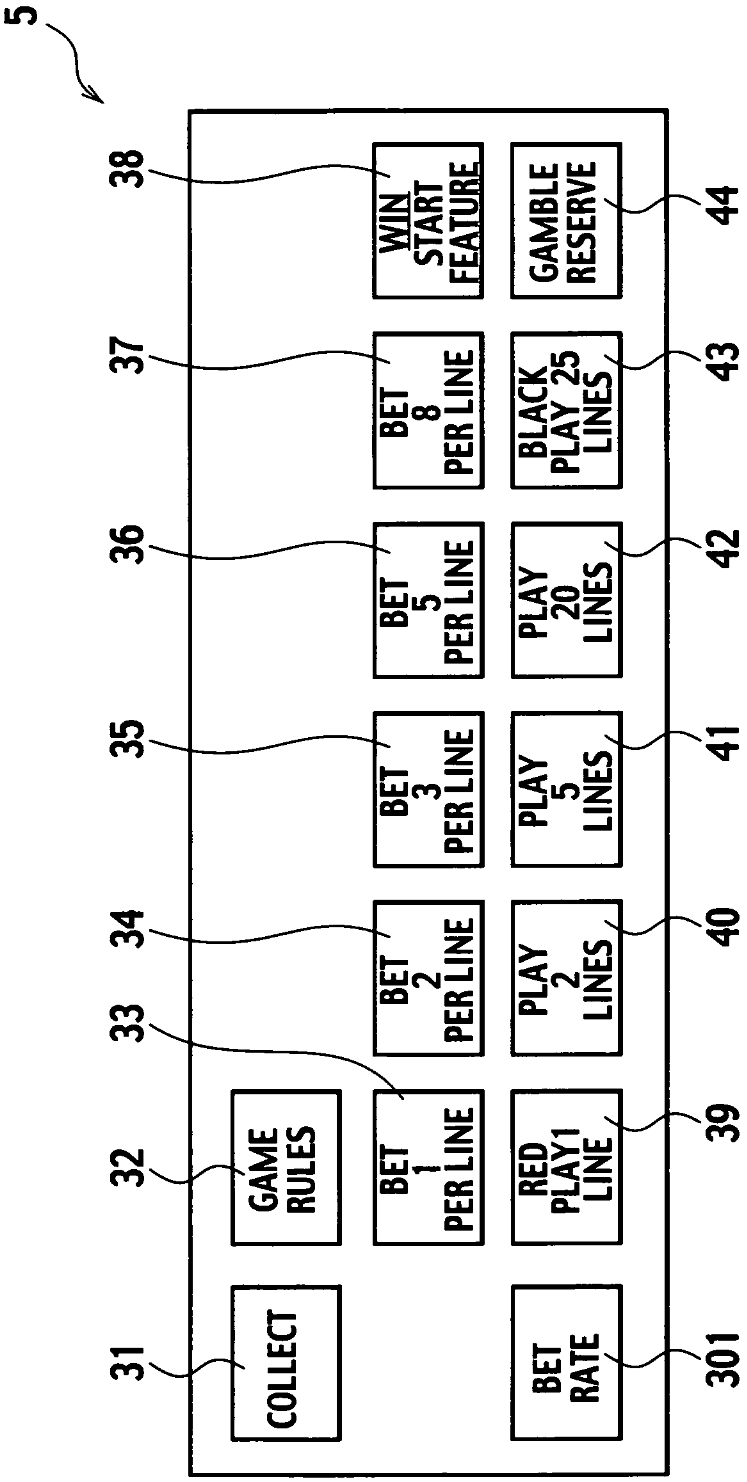
FIG. 9 is a front view of an operation table.
Figure 10:
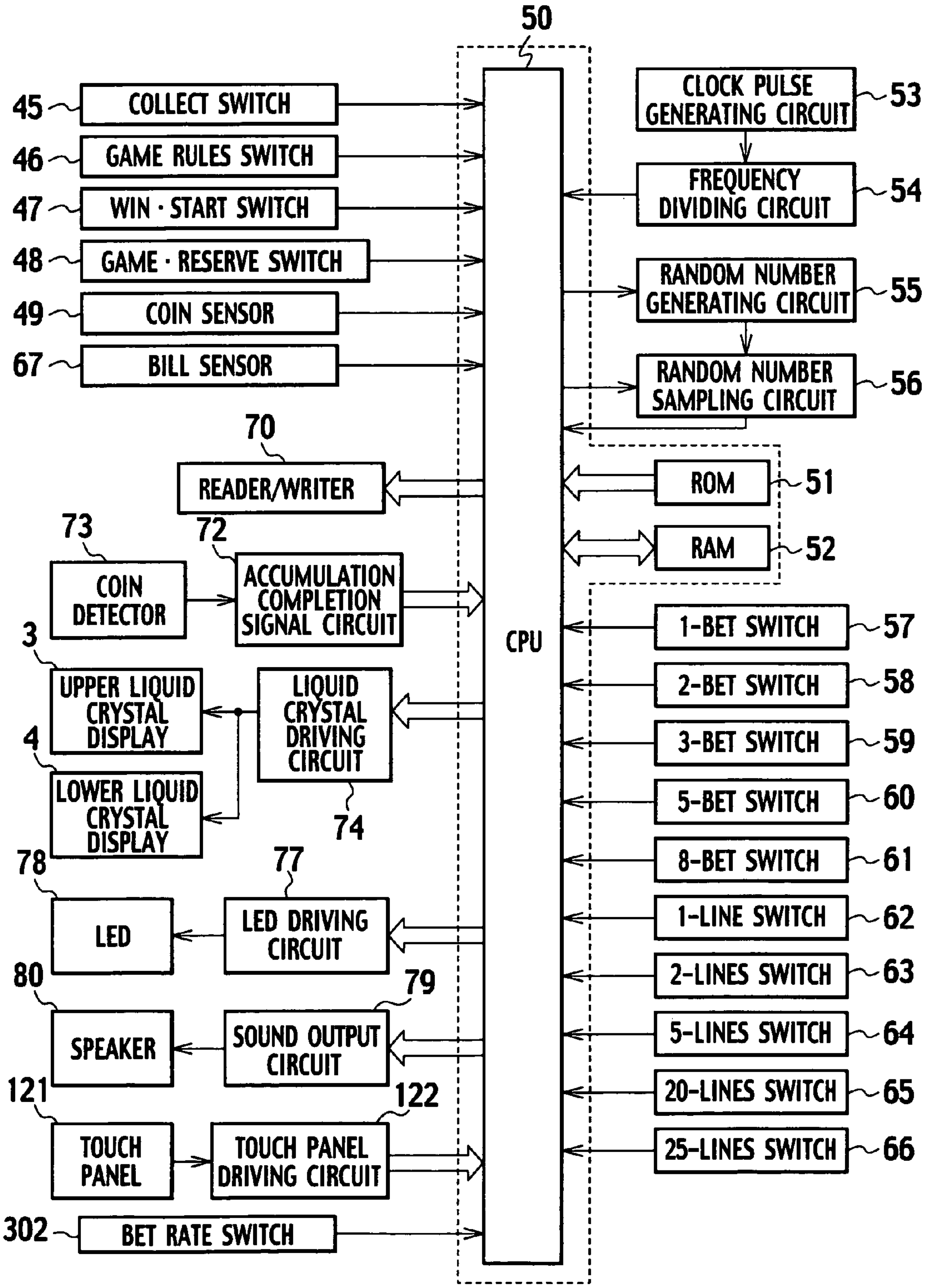
FIG. 10 is a block diagram typically showing a control system of the slot machine.

Hereunder, a gaming machine, according to the present invention, is described below in detail in connection with an embodiment, in which the present invention is concretized as a slot machine, with reference to the accompanying drawings. First, a schematic structure of the slot machine of the presently filed embodiment is described with reference to FIGS. 8 to 10. FIG. 8 is a perspective view of the slot machine. FIG. 9 is a front view of an operation table. FIG. 10 is a block diagram typically showing a control system of the slot machine.

In FIG. 8, a slot machine 1 includes a cabinet 2 by which a whole of the slot machine 1 is formed. The cabinet 2 has a front and upper area, on which an upper liquid crystal display 3 is located, and a front and central area provided with a unit front panel 20 on which a lower liquid crystal display 4 is located. The upper liquid crystal display 3 is comprised of a general-purpose liquid crystal display and, also, the lower liquid crystal display 4 is comprised of the general-purpose liquid crystal display. The upper liquid crystal display 3 provides a display of information such as gaming processes, kinds and associated awards of winning combinations and various effects related to games and further provides a display of an insertion image, indicative of a kind of inserted coin and setting image indicative of a bet rate (a value of coin per 1 BET). As shown in FIG. 8, the lower liquid crystal display 4 provides a display of credits and fundamentally provides a display of five variable display devices 21, 22, 23, 24 and 25. Variable displays (hereinafter also referred to as "scrolling displays") are provided in the various display devices 21 to 25, respectively, while scrolling various symbols, described later, each in a direction from an upper area toward a lower area.

Figure 15:
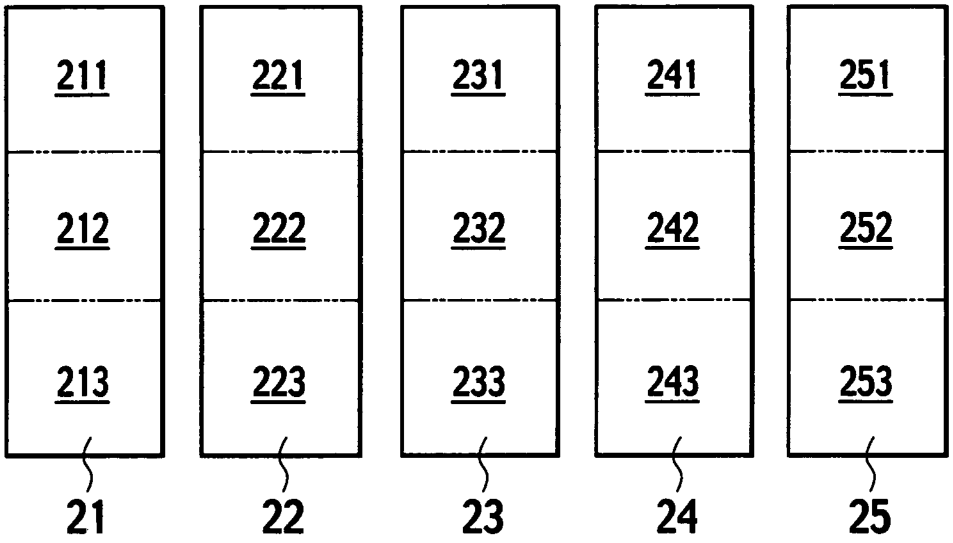
FIG. 15 is a view showing stop and display areas of the five variable display devices, respectively.

Accordingly, with the slot machine 1 of the presently filed embodiment, slot-games (with a base game and a bonus game) are practiced with video reels realized upon displays of the variable display devices 21 to 25 in the lower liquid crystal display 4. The slot-games (with the base game and the bonus game) have three symbols to be stopped for display in the variable display devices 21 to 25, respectively. That is, as shown in FIG. 15, the respective variable display devices 21 to 25 are divided into first stop display areas 211, 221, 231, 241, 251, second stop display areas 212, 222, 232, 242, 252 and third stop display areas 213, 223, 233, 243, 253, respectively, with the symbols being stopped and displayed in the stop display areas 211 to 213, 221 to 223, 231 to 233, 241 to 243, 251 to 253, respectively.

Figure 16:
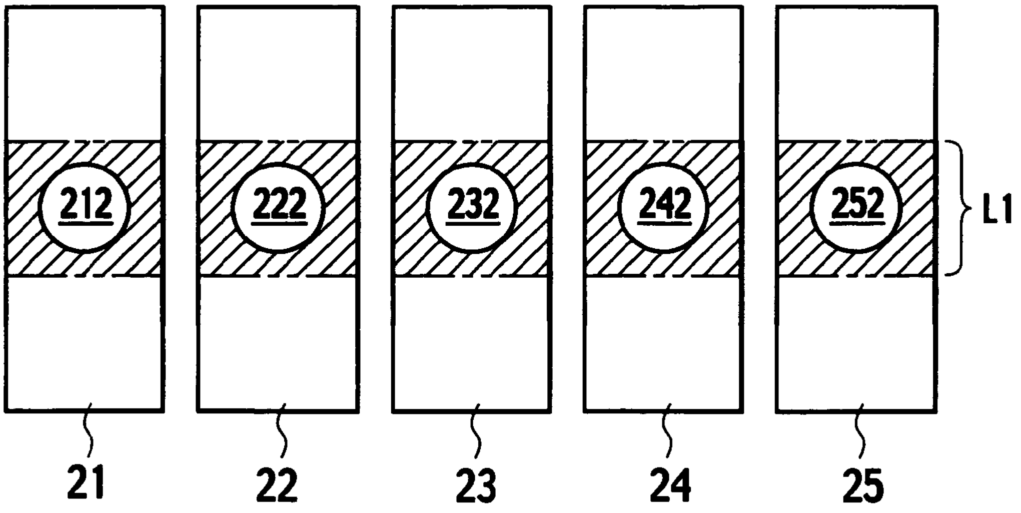
FIG. 16 is a view showing the first pay-line.
Figure 17:
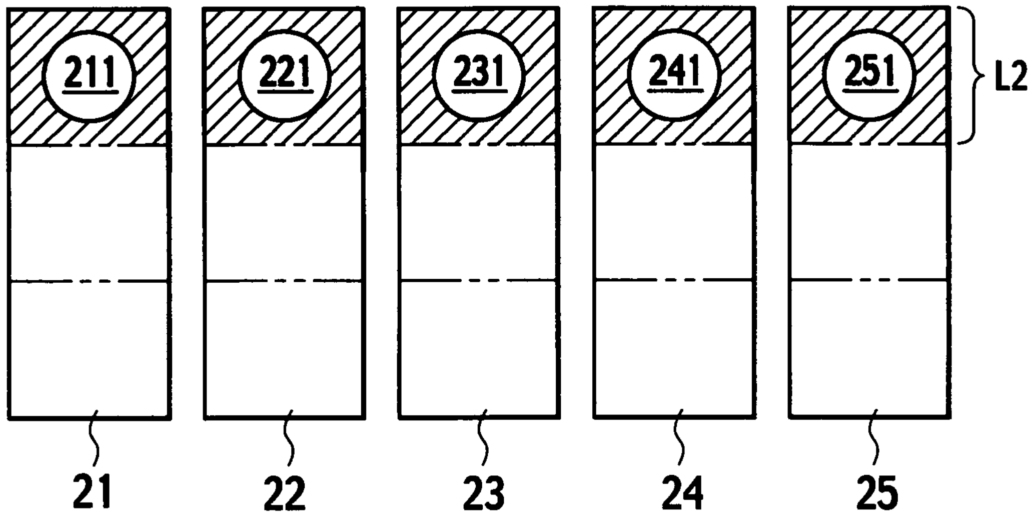
FIG. 17 is a view showing the second pay-line.
Figure 18:
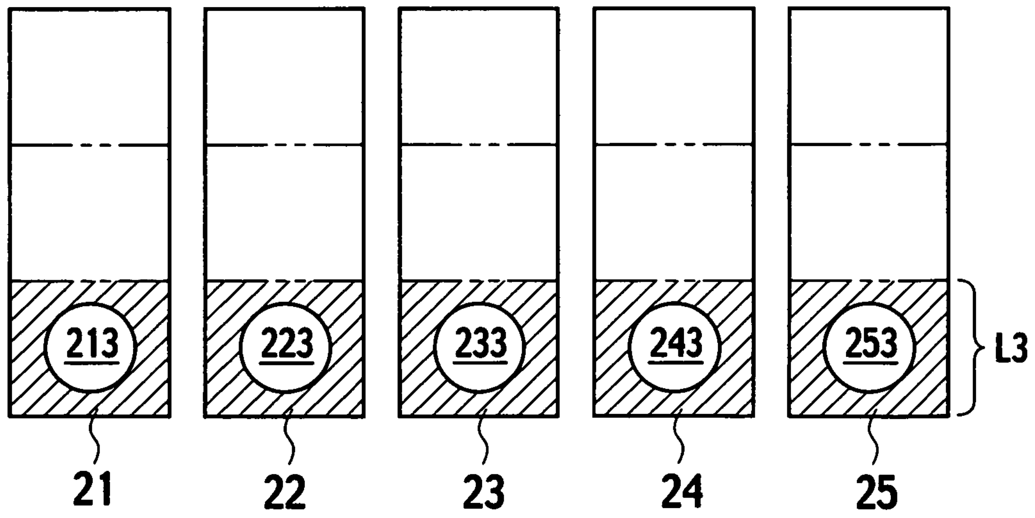
FIG. 18 is a view showing the third pay-line.

Further, the slot-games (with the base game and the bonus game) include twenty-five pay-lines formed of five areas in the stop display areas 211 to 213, 221 to 223, 231 to 233, 241 to 243, 251 to 253, respectively. When activated, each pay-line allows a player to be awarded upon alignment of specified symbols on a specific mode when the symbols are stopped and displayed, respectively. Here, for the sake of simplicity in description, three among the twenty-five pay-lines concretely described with reference to FIGS. 16 to 18. FIGS. 16 to 18 are views showing one pay-line in shaded portions.

That is, as shown in FIG. 16, the first pay-line L1 is formed of the second stop display areas 212, 222, 232, 242, and 252.

Further, as shown in FIG. 17, the second pay-line L2 is formed of the first stop display areas 211, 221, 231, 241, and 251.

Likewise, as shown in FIG. 18, the third pay-line L3 is formed of the third stop display areas 213, 223, 233, 243, and 253.

Also, as used herein, those, among the twenty-five pay-lines, which are activated, refer to "activated pay-lines".

Turning back to FIG. 8, an operation table 5 is provided in a lower area of the lower liquid crystal display 4 so as to protrude in a front area thereof. As shown in FIG. 9, the operation table 5 has an upper stage on which a "COLLECT" button 31 and a "GAME RULES" button 32 are located in the leftmost area, an intermediate stage provided with a "BET1 PER LINE" button 33, a "BET2 PER LINE" button 34, a "BET3 PER LINE" button 35, a "BET5 PER LINE" button 36, a "BET8 PER LINE" button 37 and a "WIN START FEATURE" button 38 in this order from the leftmost side, and a lower stage provided with a "BET RATE" button 301, a "RED PLAY1 LINE" button 39, a "PLAY2 LINES" button 40, a "PLAY5 LINES" button 41, a "PLAY20 LINES" button 42, a "BLACK PLAY25 LINES" button 43 and a "GAMBLE RESERVE" button 44. Moreover, as shown in FIG. 8, a coin insertion slot 9 and a bill insertion slot 10 are provided on a right side of the operation table 5 and, in addition, a reader/writer 70 is located on the operation table 5 at a left and lower side thereof.

The "COLLECT" button 31 plays a role as a button that is pressed at the end of the base game. As the "COLLECT" button 31 is pressed, the reader/writer 70 stores the number of credits, acquired in the games, in an IC card (not shown), thereby paying out the number of coins equivalent to the number of credits acquired in the games. Also, the "COLLECT" button 31 additionally includes a "COLLECT" switch 45 that is operative such that when the "COLLECT" button 31 is pressed, a switch signal, generated by the "COLLECT" switch 45, is outputted to a CPU 50 (see FIG. 10).

The "GAME RULES" button 32 plays a role as a button that is pressed when an operational method or the like of the game is unclear. As the "GAME RULES" button 32 is pressed, a variety of help information are displayed in the upper liquid crystal display 3 and the lower liquid crystal display 4. Also, the "GAME RULES" button 32 additionally includes a "GAME RULES" switch 46 that is operative such that when the "GAME RULES" button 32 is pressed, a switch signal, generated by the "GAME RULES" switch 46, is outputted to the CPU 50 (see FIG. 10).

The coin insertion slot 9 is configured to allow the insertion of five kinds of coins such as a 5-cent coin, a 10-cent coin, a 25-cent, a 50-cent coin and one-dollar coin. Based on diameters, thicknesses, and weights of coins being inserted into the coin insertion slot 9, a coin sensor 49 generates a coin detection signal, specifying the kind of an inserted coin, which in turn is outputted to the CPU 50 (see FIG. 10), thereby permitting the credits to be added by the number of inserted coin. Also, the five kinds of coins, inserted into the coin insertion slot 9, are accumulated in a hopper (now shown) located inside the cabinet 2. In contrast, if other coins than the coins of five kinds are inserted into the coin insertion slot 9, the coin sensor 49 distinguishes the relevant coins (see FIG. 10), which in turn are returned from a coin payout opening 15 to a coin-receiving portion 16.

Further, the bill insertion slot 10 is provided with a bill sensor 67 that is able to discriminate a kind of bills based on widths, lengths and watermarks of bills, whereby as a bill is inserted into the bill insertion slot 10, the bill sensor 67 generates a bill detection signal that in turn is outputted to the CPU 50 (see FIG. 10) to allow credits to be added by a value of inserted bills.

The "BET1 PER LINE" button 33 plays a role as a button that every time the "BET1 PER LINE" button 33 is pressed, the pay-lines are activated by one, respectively. The "BET1 PER LINE" button 33 additionally includes a "1-BET" switch 57 that is operative such that when the "BET1 PER LINE" button 33 is pressed, the "1-BET" switch 57 generates a switch signal that in turn is outputted to the CPU 50 (see FIG. 10). The "BET2 PER LINE" button 34 plays a role as a switch that when pressed, allows a game to start with two bets on the respective pay-lines. The "BET2 PER LINE" button 34 additionally includes a “2-BET” switch 58 that is operative such that when the “BET2 PER LINE” button 34 is pressed, a switch signal, generated by the “2-BET” switch 58, is outputted to the CPU 50 (see FIG. 10).

The “BET3 PER LINE” button 35 plays a role as a button that when pressed, the pay-lines are activated by three bets. The “BET3 PER LINE” button 35 additionally includes a 3-BET switch 59 that is operative such that when the “BET3 PER LEE” button 35 is pressed, the 3-BET switch 59 generates a switch signal that in turn is outputted to the CPU 50 (see FIG. 10). The “BET5 PER LINE” button 36 plays a role as a switch that when pressed, allows the game to start with five bets on the respective pay-lines. The “BET5 PER LINE” button 36 additionally includes a “5-BET” switch 60 that is operative such that when the “BET5 PER LINE” button 36 is pressed, a switch signal, generated by the “5-BET” switch 60, is outputted to the CPU 50 (see FIG. 10).

The “BET8 PER LINE” button 37 plays a role as a button that when pressed, the pay-lines are activated by 8 bets. The “BET8 PER LINE” button 37 additionally includes a “8-BET” switch 61 that is operative such that when the “BET8 PER LINE” button 37 is pressed, the “8-BET” switch 61 generates a switch signal that in turn is outputted to the CPU 50 (see FIG. 10). Accordingly, pressing “BET1 PER LINE” button 33, the “BET2 PER LINE” button 34, the “BET3 PER LINE” button 35, the “BET5 PER LINE” button 36 and the “BET8 PER LINE” button 37 enables a player to make betting with a bet number in 1, 2, 3, 5 and 8 bets.

The “WIN START FEATURE” button 38 plays a role as a button to begin a bonus game while permitting an award, acquired in the bonus game, to be added to the credit. The “WIN START FEATURE” button 38 additionally includes a “WIN START” switch 47 that is operative such that when pressed, the “WIN START” switch 47 generates a switch signal that in turn is outputted to the CPU 50 (see FIG. 10).

The “BET RATE” button 301 plays a role as a button by which a “BET RATE” (a value of coin per one BET) is set. The “BET RATE” button 301 additionally includes a “BET RATE” switch 302 that is operative such that when pressed, the “BET RATE” switch 302 generates a switch signal that in turn is outputted to the CPU 50 (see FIG. 10). Here, the “BET RATE” is described. As used herein, the term “BET RATE” is meant by the fact that the number of credits, needed for increasing the number of bets by one, is represented by the amount of coins and includes “5-cent”, “10-cent”, “25-cent”, “50-cent” and “one dollar”. Each time the “BET RATE” button 301 is pressed, the “BET RATE” is cyclically altered in an order expressed as “5-cent”→“10-cent”→“25-cent”→“50-cent”→“one dollar”→“5-cent”→“10-cent”→ . . . .

The “RED PLAY1 LINE” button 39 plays a role as a button by which a game is started with “1” activated pay-line. The “RED PLAY1 LINE” button 39 additionally includes a “1-LINE” switch 62 that is operative such that when pressed, the “1-LINE” switch 62 generates a switch signal that in turn is outputted to the CPU 50 (see FIG. 10). Further, the “PLAY2 LINES” button 40 plays a role as a button by which the game is started with “2” activated pay-lines. The “PLAY2 LINES” button 40 additionally includes a “2-LINES” switch 63 operative such that when pressed, the “2-LINES” switch 63 generates a switch signal to be outputted to the CPU 50 (see FIG. 10).

The “PLAY5 LINES” button 41 plays a role as a button by which the game is started with “5” activated pay-lines. The “PLAY5 LINES” button 41 additionally includes a “5-LINES” switch 64 operative such that when pressed, the “5-LINES” switch 64 generates a switch signal that in turn is outputted to the CPU 50 (see FIG. 10). Further, a “PLAY20 LINES” button 42 plays a role as a button by which the game is started with “20” activated pay-lines. The “PLAY20 LINES” button 42 additionally includes a “20-LINES” switch 65 operative such that when pressed, the “20-LINES” switch 65 generates a switch signal that in turn is outputted to the CPU 50 (see FIG. 10).

The “BLACK PLAY25 LINES” button 43 plays a role as a button by which the game is started with “25” activated pay-lines. The “BLACK PLAY25 LINES” button 43 additionally includes a “25 LINES” switch 66 operative such that when pressed, the “25 LINES” switch 66 generates a switch signal that in turn is outputted to the CPU 50 (see FIG. 10).

With the “RED PLAY1 LINE” button 39 pressed, the pay-line L1, shown in FIG. 16, is activated. Further, if the “PLAY2 LINES” button 40 is pressed, the pay-lines L1, L2, shown in FIGS. 16 and 17, are activated. Furthermore, if the “PLAY5 LINES” button 41 is pressed, five wining lines, including the three pay-lines L1 to L3, shown in FIGS. 16 to 18, and two pay-lines (not shown), are activated. Moreover, if the “PLAY20 LINES” button 42 is pressed, twenty-five wining lines, including the three pay-lines L1 to L3 shown in FIGS. 16 to 18, and twenty-two pay-lines (not shown) are activated.

Accordingly, the number of activated pay-lines, available to be determined upon pressions of the “RED PLAY1 LINE” button 39, the “PLAY2 LINES” button 40, the “PLAY5 LINES” button 41, the “PLAY20 LINES” button 42 and the “BLACK PLAY25 LINES” button 43, is able to include “1”, “2”, “5”, “20” and “25”.

Further, the “RED PLAY1 LINE” button 39, the “PLAY2 LINES” button 40, the “PLAY5 LINES” button 41, the “PLAY20 LINES” button 42 and the “BLACK PLAY25 LINES” button 43 play roles as buttons that begin variable displays of respective symbols with the associated variable display devices 21 to 25 in the lower liquid crystal display 4.

Also, the “RED PLAY1 LINE” button 39 and the “BLACK PLAY25 LINES” button 43 are also used when selecting red and black colors during play in a double down game that is practiced using credits obtained in the bonus game.

The “GAMBLE RESERVE” button 44 plays a role as a button that is pressed when leaving a seat or allows the game to shift to the double down game after the bonus game has been finished. The “GAMBLE RESERVE” button 44 additionally includes a “GAMBLE RESERVE” switch 48 operative such that when pressed, the “GAMBLE RESERVE” switch 48 generates a switch signal that in turn is outputted to the CPU 50 (see FIG. 10).

Further, the coin payout opening 15 is formed in the cabinet 2 at a lower area thereof in which the coin-receiving portion 16 is provided for receiving coins returned from the coin payout opening 15.

Referring to FIG. 12, description is made of exemplary symbols, to be variably displayed over the lower liquid crystal display device 4 during play in the base game, appearing upon scrolling of the respective variable display devices 21 to 25. In FIG. 12, a column of symbols displayed on the first reel strip 101 represents a column of symbols that are variably displayed on the variable display device 21; a column of symbols displayed on the second reel strip 102 represents a column of symbols that are variably displayed on the variable display device 22; a column of symbols displayed on the third reel strip 103 represents a column of symbols that are variably displayed on the variable display device 23; a column of symbols displayed on the fourth reel strip 104 represents a column of symbols that are variably displayed on the variable display device 24; and a column of symbols displayed on the fifth reel strip 105 represents a column of symbols that are variably displayed on the variable display device 25.

Here, the rows of symbols shown on the reel strips 101 to 105 include layouts of the symbols different from each other, with each column of these symbols including twelve symbols in suitable combination of "LOBSTER", "SHARK", "FISH", "PUNK", "OCTOPUS", "CRAB", "WORM", "A", "K", "Q", "J" and "SARDINE".

As used herein, the term "LOBSTER" refers to a symbol of a lobster. Further, the terms "SHARK", "FISH", "PUNK", "OCTOPUS", "CRAB", "WORM", "A", "K", "Q", "J" and "SARDINE" represent symbols of a shark, a fish, a person with a guitar, an octopus, a crab, a worm and a sardine, respectively. Moreover, as used herein, the terms "A", "K", "Q" and "J" represent symbols of alphabetic characters, respectively.

The symbol "SARDINE" plays a role as a scatter symbol to allow the game to shift to the bonus game, as described later. When three or more "SARDINE" symbols are stopped and displayed in combination on the variable display devices 21 to 25 regardless of the activated payline, the game is shifted to the bonus game.

Also, under situations wherein the rows of the symbols shown on the reel strips 101 to 105 are stopped for display upon scrolling of the variable display devices 21 to 25 for display, the three symbols are caused to stop and displayed with the respective variable display devices.

Further, a variety of winning combinations are preliminarily set for a plurality of kinds of combinations of the respective symbols as set forth above. An award is added to a credit depending on a winning combination, when a combination of the symbols associated with the winning combination is caused to stop on an activated pay-line, in the same manner as that of the related art slot machine, and description of the same is herein omitted.

Now, a structure of a control system of the slot machine 1 is described with reference to FIG. 10. FIG. 10 is a block diagram typically showing the control system of the slot machine 1.

In FIG. 10, the control system of the slot machine 1 is basically comprised of the CPU 50 as a core to which a ROM 51 and a RAM 52 are connected. The ROM 51 stores a main process program, a base game program, a bonus game program, a sortition table based on which symbols to be stopped for display of the base game are drawn, a sortition table on which symbols to be stopped and displayed on the bonus game are drawn, other various programs needed for the slot machine 1 to be controlled, and data tables, etc., which are described later. Also, the RAM 52 plays a role as a memory that temporarily stores various data calculated when the CPU 50 executes the various programs.

Further, a clock pulse generating circuit 53, which generates a train of reference clock pulses, and a frequency dividing circuit 54 are connected to the CPU 50, to which a random number generating circuit 55, by which a random number is generated, and a random number sampling circuit 56 are also connected. The random number, subjected to sampling through the random number sampling circuit 56, is used for executing various sortitions on the winning combination, etc. In addition, connected to the CPU 50 are the "COLLECT" switch 45 additionally provided on the "COLLECT" button 31, the "GAME/RULES" switch 46 additionally provided on the "GAME RULES" button 32, the "1-BET" switch 57 additionally provided on the "BET1 PER LINE" button 33, the "2-BET" switch 58 additionally provided on the "BET2 PER LINE" button 34, the "3-BET" switch 59 additionally provided on the "BET3 PER LINE" button 35, the "5-BET" switch 60 additionally provided on the "BET5 PER LINE" button 36, the "8-BET" switch 61 additionally provided on the "BET8 PER LINE" button 37, the "WIN/START" switch 47 additionally provided on the "WIN START FEATURE" button 38, the "1-LE" switch 62 additionally provided on the "RED PLAY1 LINE" button 39, the "2-LINES" switch 63 additionally provided on the "PLAY2 LINES" button 40, the "5-LINES" switch 64 additionally provided on the "PLAYS5 LINES" button 41, the "20-LINES" switch 65 additionally provided on the "PLAY20 LINES" button 42, the "25-LINES" switch 66 additionally provided on the "BLACK PLAY25 LINES" button 43, the "GAMBLE RESERVE" switch 48 additionally provided on the "GAMBLE RESERVE" button 44, and the "BET RATE" switch 302 additionally provided on the "BET RATE" button 301. The CPU 50 performs control for executing various operations associated with the respective buttons in response to the switch signals outputted from the respective switches upon pressions thereof.

Further, the coin sensor 49, disposed in the coin insertion slot 9, and the bill sensor 67, disposed in the bill insertion slot 10, are connected to the CPU 50. The coin sensor 49 detects a kind of and amount of coins inserted from the coin insertion slot 9 to calculate the number of credits equivalent to the amount of coins inserted in response to the coin detection signal outputted from the coin sensor 49. The bill sensor 67 detects a kind of and amount of bills inserted from the bill insertion slot 10 to allow the CPU 50 to calculate the number of credits equivalent to the amount of inserted bills in response to the bill detection signal outputted from the bill sensor 67.

The reader/writer 70 is connected to the CPU 50. As a drive signal is outputted from the CPU 50 to the reader/writer 70, the reader/writer 70 stores a given number of credits in an IC card (not shown), upon which a given number of coins are paid out. Also, the reader/writer 70 may be replaced with, for instance, a printing device that issues a receipt on which a given number of credits is printed.

Moreover, the coin detector 73 is connected to the CPU 50 via an accumulation completion signal circuit 72. The coin detector 73 is mounted inside the hopper (not shown) and upon detection of the hopper (not shown) being full of the accumulated coins, a full coin detection signal is outputted from the coin detector 73 to the accumulation completion signal circuit 72, which in turn outputs an accumulation completion signal to the CPU 50. In addition, the upper liquid crystal display 3 and the lower liquid crystal display 4 are connected to the CPU 50, by which the upper liquid crystal display 3 and the lower liquid crystal display 4 are controlled.

Figure 11:
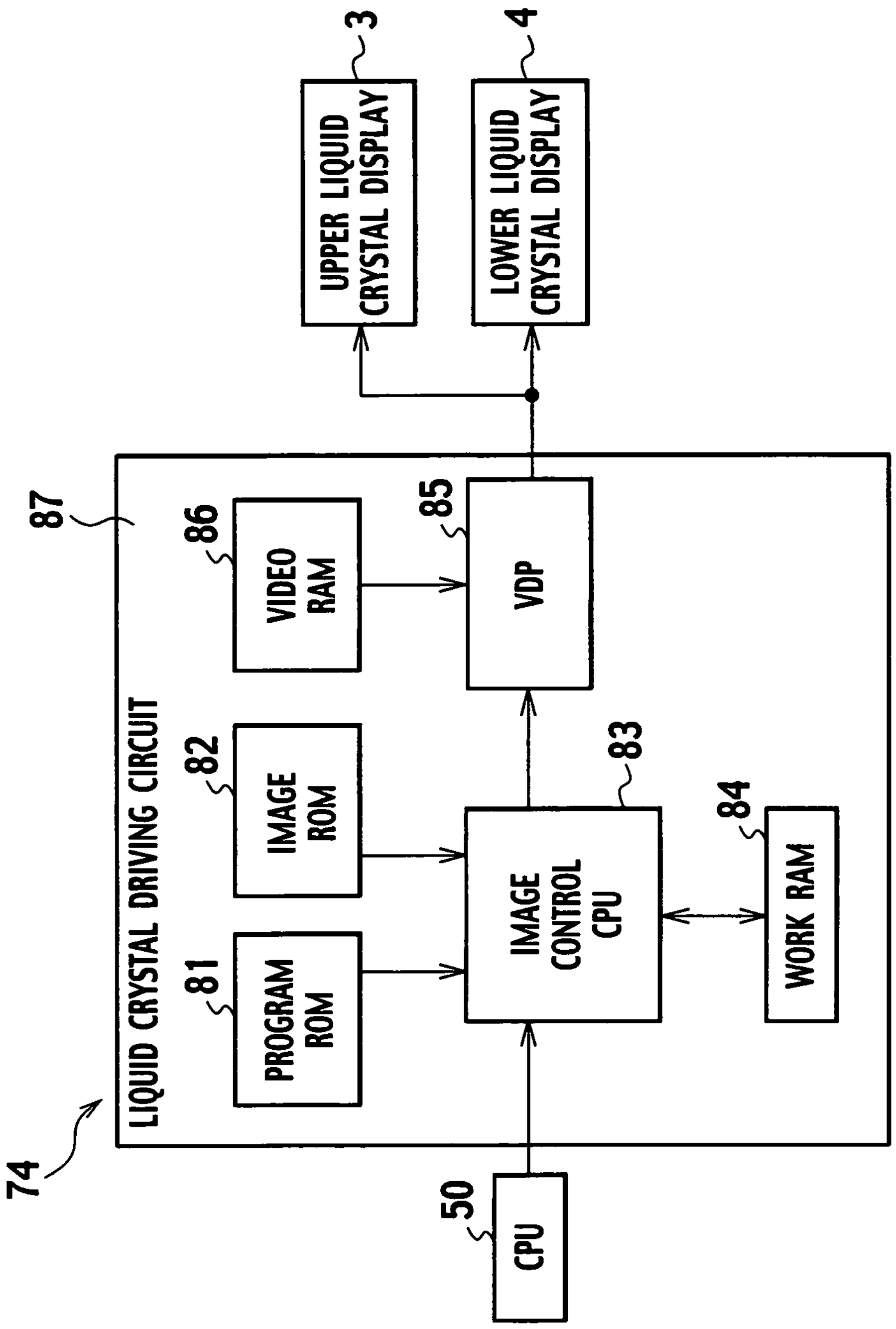
FIG. 11 is a block diagram typically showing a liquid crystal driving circuit of a liquid crystal display.

As shown in FIG. 11, the liquid crystal driving circuit 74 takes the form of a structure wherein a program ROM 81, an image ROM 82, an image control CPU 83, a work RAM 84, a video display processor (VDP) 85 and a video RAM 86, etc., are mounted on a liquid crystal driving circuit board 87. The program ROM 81 stores image control programs and various selection tables related to display contents of the upper liquid crystal display 3 and the lower liquid crystal display 4. Further, the image ROM 82 stores dot data to form images such as, for instance, the rows of symbols on the reel strips 101 to 105, shown in FIG. 12, which are displayed over the lower liquid crystal display 4 (or the variable display devices 21 to 25). Furthermore, the image control CPU 83 serves to determine images, to be displayed over the upper liquid crystal display 3 and the lower liquid crystal display 4 from among dot data preliminarily stored in the image ROM 82 in response to parameters set by the CPU 50, depending on the image control program preliminarily stored in the program ROM 81. Moreover, the work RAM 84 is a temporary storage device used when executing the image control program with the image control CPU 83. In addition, the VDP 85 serves to form images depending on displayed contents, determined by the image control CPU 83, to be outputted to the upper liquid crystal display 3 and the lower liquid crystal display 4, respectively. This allows the rows of the symbols, shown on the reel strips 101 to 105, respectively, to be provided on the lower liquid crystal display 4 (or the variable display devices 21 to 25) in scrolling displays, thereby providing a display of insertion images and setting images over the upper liquid crystal display 3 in a manner as described below. Also, the video RAM 86 is a temporary storage device for use in forming an image with the VDP 85.

Further, LEDs 78 are connected to the CPU 50 via an LED driving circuit 77. A large number of LEDs 78 are mounted on the front face of the slot machine 1 to be controllably turned on or turned off with the LED driving circuit 77 in response to drive signals from the CPU 50 when providing a variety of effects. Additionally, a speaker 80, connected to the CPU 50 via a sound output circuit 79, generates a variety of sound effects, when providing variable effects, in response to output signals from the sound output circuit 79.

Figure 26:
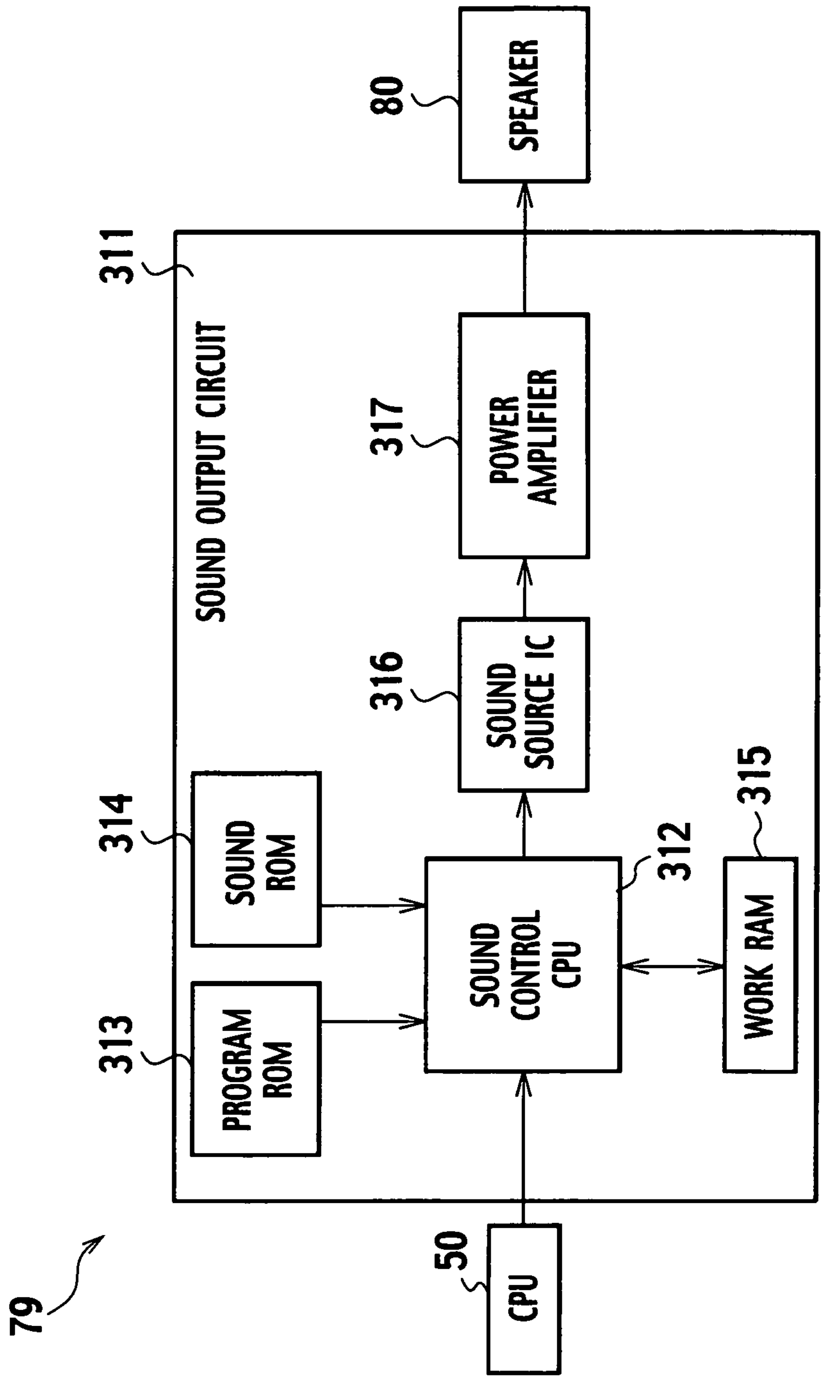
FIG. 26 is a block diagram typically showing a sound output circuit for speaker.

As shown in FIG. 26, the sound output circuit 79 is comprised of a program ROM 313, a sound ROM 314, a sound control CPU 312, a work RAM 315, a sound source IC 316 and a power amplifier 317, etc., which are mounted on a sound output circuit board 311. The program ROM 313 stores a sound control program, related to an output of the speaker 80, and various selection tables. Further, the sound ROM 314 stores musical scale data or the like for a sound to be outputted by the speaker 80. Furthermore, the sound control CPU 312 serves to determine the sound, to be outputted from the speaker 80, from among musical scale data, preliminarily stored in the sound ROM 314, in accordance with the sound control program preliminarily stored in the program ROM 313. Moreover, the work RAM 315 is a temporary storage device for use in executing the sound control program with the sound control program CPU 312. Also, the sound source IC 316 creates a wide variety of tones. In addition, the power amplifier 317 serves to amplify the sound to be created by the sound source IC 316. This allows the speaker 80 to reproduce the insertion sound and setting sounds in a manner as will be described later.

Now, referring to FIG. 14, description is made of the sortition table for use in determining the symbols to be stopped and displayed on the activated pay-line L1, shown in FIG. 16, when playing a base game using the five variable display devices 21 to 25 in the slot machine 1. FIG. 14 is an illustrative view showing the sortition table of the stop and display symbols for use in playing on the base game using the five variable display devices.

The symbols, stopped and displayed on the activated pay-line defined by the second stop display areas 212, 222, 232, 242, and 252 of the variable display devices 21 to 25, are determined for the variable display devices 21 to 25, respectively. To this end, code Nos. from "00" to "29" are allotted to the symbols on the reel strips 101 to 105 as shown in FIG. 12, and on the other hand, a sortition table, shown in FIG. 14, is prepared. The five random numbers, associated with the respective variable display devices 21 to 25, are subjected to the sampling via the random number sampling circuit 56.

Speaking of the column of the symbols designated on the first reel strip 101, shown in FIG. 12, to be provided in scrolling display on the variable display device 21, if the random number value, resulting upon sampling with the random number sampling circuit 56, represents "0", a symbol (alphabetic character) "J", to which the code No. "00" is allotted, is stopped and displayed on the relevant activated pay-line. If the relevant random number value represents "1", a symbol (alphabetic character) "Q", to which the code No. "01" is allotted, is stopped and displayed on the relevant activated pay-line. If the relevant random number value represents "2", a symbol (alphabetic character) "LOBSTER", to which the code No. "02" is allotted, is stopped and displayed on the relevant activated pay-line. If the relevant random number value represents "3", a symbol (alphabetic character) "J", to which the code No. "03" is allotted, is stopped and displayed on the relevant activated pay-line. If the relevant random number value represents "4", a symbol (alphabetic character) "Q", to which the code No. "04" is allotted, is stopped and displayed on the relevant activated pay-line. If the relevant random number value represents "5", a symbol "CRAB", to which the code No. "05" is allotted, is stopped and displayed on the relevant activated pay-line. If the relevant random number value represents "6", a symbol (alphabetic character) "A", to which the code No. "06" is allotted, is stopped and displayed on the relevant activated pay-line. If the relevant random number value represents "7", a symbol "WORM", to which the code No. "07" is allotted, is stopped and displayed on the relevant activated pay-line. If the relevant random number value represents "8", a symbol (alphabetic character) "K", to which the code No. "08" is allotted, is stopped and displayed on the relevant activated pay-line. If the relevant random number value represents "9", a symbol (alphabetic character) "FISH", to which the code No. "09" is allotted, is stopped and displayed on the relevant activated pay-line. If the relevant random number value represents "10", a symbol (PERSON WITH GUITAR) "PUNK", to which the code No. "10" is allotted, is stopped and displayed on the relevant activated pay-line.

Further, if the relevant random number value represents "11", a symbol (alphabetic character) "Q", to which the code No. "11" is allotted, is stopped and displayed on the relevant activated pay-line. If the relevant random number value represents "12", a symbol "SHARK", to which the code No. "12" is allotted, is stopped and displayed on the relevant activated pay-line. If the relevant random number value represents "13", a symbol "CRAB", to which the code No. "13" is allotted, is stopped and displayed on the relevant activated pay-line. If the relevant random number value represents "14", a symbol (alphabetic character) "K", to which the code No. "14" is allotted, is stopped and displayed on the relevant activated pay-line. If the relevant random number value represents "15", a symbol (alphabetic character) "A", to which the code No. "15" is allotted, is stopped and displayed on the relevant activated pay-line. If the relevant random number value represents "16", a symbol "OCTOPUS", to which the code No. "16" is allotted, is stopped and displayed on the relevant activated pay-line. If the relevant random number value represents "17", a symbol (alphabetic character) "3", to which the code No. "17" is allotted, is stopped and displayed on the relevant activated pay-line. If the relevant random number value represents "18", a symbol (alphabetic character) "Q", to which the code No. "18" is allotted, is stopped and displayed on the relevant activated pay-line. If the relevant random number value represents "19", a symbol "FISH", to which the code No. "19" is allotted, is stopped and displayed on the relevant activated pay-line.

Further, if the relevant random number value represents "20", a symbol (alphabetic character) "K", to which the code No. "20" is allotted, is stopped and displayed on the relevant activated pay-line. If the relevant random number value represents "21", a symbol (alphabetic character) "J", to which the code No. "21" is allotted, is stopped and displayed on the relevant activated pay-line. If the relevant random number value represents "22", a symbol "SARDINE", to which the code No. "22" is allotted, is stopped and displayed on the relevant activated pay-line. If the relevant random number value represents "23", a symbol "CRAB", to which the code No. "23" is allotted, is stopped and displayed on the relevant activated pay-line. If the relevant random number value represents "24", a symbol "J" (alphabetic character), to which the code No. "24" is allotted, is stopped and displayed on the relevant activated pay-line. If the relevant random number value represents "25", a symbol "WORM", to which the code No. "25" is allotted, is stopped and displayed on the relevant activated pay-line. If the relevant random number value represents "26", a symbol "Q" (alphabetic character), to which the code No. "26" is allotted, is stopped and displayed on the relevant activated pay-line. If the relevant random number value represents "27", a symbol "CRAB", to which the code No. "27" is allotted, is stopped and displayed on the relevant activated pay-line. If the relevant random number value represents "28", a symbol "A" (alphabetic character), to which the code No. "28" is allotted, is stopped and displayed on the relevant activated pay-line. If the relevant random number value represents "29", a symbol "FISH", to which the code No. "29" is allotted, is stopped and displayed on the relevant activated pay-line.

Also, these controls are similarly performed for the column of symbols, designated on the second reel strip 102, to be provided in scrolling display with the variable display device 22, the column of symbols, designated on the third reel strip 103 shown in FIG. 12, to be provided in scrolling display with the variable display device 23, the column of symbols, designated on the fourth reel strip 104 shown in FIG. 12, to be provided in scrolling display with the variable display device 24, and the column of symbols, designated on the fifth reel strip 105 shown in FIG. 12, to be provided in scrolling display with the variable display device 25.

Next, the winning combination and the associated award are described with reference to FIG. 13 in respect of a case wherein a base game is practiced using the five variable display devices 21 to 25 in the slot machine 1. FIG. 13 is an illustrative view showing the winning combination and the associated award for the case wherein the base game is practiced using the five variable display devices and shows a case wherein the number of bet is "1". Accordingly, if the number of bet is "1", a value of the credit, shown in FIG. 13, is added to the credit and if the number of bet is "2", a value, resulting from multiplying the value of award, shown in FIG. 13, by the number of bet, is added to the credit.

Now, concrete description is made of the winning combination and the associated award for the case wherein the base game is executed. Saying of the symbol "LOBSTER", as shown in FIG. 13, an award "10" is obtained when the relevant symbols are consecutively stopped and displayed in alignment with the activated pay-line on the variable display devices 21 and 22 (in case of "2K" wherein the two symbols consecutively appear from a left end). Further, an award "320" is obtained when the relevant symbols are consecutively stopped and displayed in alignment with the activated pay-line on the variable display devices 21 to 23 (in case of "3K" wherein the three symbols consecutively appear from the left end). Further, an award "2500" is obtained when the symbols are consecutively stopped and displayed in alignment with the activated pay-line on the variable display devices 21 to 24 (in case of "4K" wherein the four symbols consecutively appear from the left end). Furthermore, an award "6000" is obtained when the symbols are consecutively stopped and displayed in alignment with the activated pay-line on the variable display devices 21 to 25 (in case of "5K" wherein the five symbols consecutively appear from the left end).

Further, saying of the symbol "SHARK", an award "3" is obtained when the symbols are consecutively stopped and displayed on the activated pay-line in the variable display devices 21 and 22 (in case of "2K" wherein the two symbols consecutively appear from the left end). Further, an award "25" is obtained when the symbols are consecutively stopped and displayed on the activated pay-line in the variable display devices 21 to 23 (in case of "3K" wherein the three symbols consecutively appear from the left end). Further, an award "150" is obtained when the symbols are consecutively stopped and displayed on the activated pay-line in the variable display devices 21 to 24 (in case of "4K" wherein the four symbols consecutively appear from the left end). Furthermore, an award "1000" is obtained when the symbols are consecutively stopped and displayed on the activated pay-line in the variable display devices 21 to 25 (in case of "5K" wherein the five symbols consecutively appear from the left end).

Further, saying of the symbol "FISH", an award "2" is obtained when the symbols are consecutively stopped and displayed on the activated pay-line in the variable display devices 21 and 22 (in case of "2K" wherein the two symbols consecutively appear from the left end). Further, an award "15" is obtained when the symbols are consecutively stopped and displayed on the activated pay-line in the variable display devices 21 to 23 (in case of "3K" wherein the three symbols consecutively appear from the left end). Further, an award "120" is obtained when the symbols are consecutively stopped and displayed on the activated pay-line in the variable display devices 21 to 24 (in case of "4K" wherein the four symbols consecutively appear from the left end). Furthermore, an award "500" is obtained when the symbols are consecutively stopped and displayed in the activated pay-line on the variable display devices 21 to 25 (in case of "5K" wherein the five symbols consecutively appear from the left end).

Further, saying of the symbol "PUNK" (person with guitar), an award "2" is obtained when the symbols are consecutively stopped and displayed on the activated pay-line in the variable display devices 21 and 22 (in case of "2K" wherein the two symbols consecutively appear from the left end). Further, an award "10" is obtained when the symbols are consecutively stopped and displayed on the activated pay-line in the variable display devices 21 to 23 (in case of "3K" wherein the three symbols consecutively appear from the left end). Further, an award "120" is obtained when the symbols are consecutively stopped and displayed on the activated pay-line in the variable display devices 21 to 24 (in case of "4K" wherein the four symbols consecutively appear from the left end). Furthermore, an award "400" is obtained when the symbols are consecutively stopped and displayed on the activated pay-line in the variable display devices 21 to 25 (in case of "5K" wherein the five symbols consecutively appear from the left end).

Further, saying of the symbol "OCTOPUS", an award "2" is obtained when the symbols are consecutively stopped and displayed on the activated pay-line in the variable display devices 21 and 22 (in case of "2K" wherein the two symbols consecutively appear from the left end). Further, an award "8" is obtained when the symbols are consecutively stopped and displayed on the activated pay-line in the variable display devices 21 to 23 (in case of "3K" wherein the three symbols consecutively appear from the left end). Further, an award "50" is obtained when the symbols are consecutively stopped and displayed on the activated pay-line in the variable display devices 21 to 24 (in case of "4K" wherein the four symbols consecutively appear from the left end). Furthermore, an award "300" is obtained when the symbols are consecutively stopped and displayed on the activated pay-line in the variable display devices 21 to 25 (in case of "5K" wherein the five symbols consecutively appear from the left end).

Further, saying of the symbol "CRAB", an award "7" is obtained when the symbols are consecutively stopped and displayed on the activated pay-line in the variable display devices 21 to 23 (in case of "3K" wherein the three symbols consecutively appear from the left end). Further, an award "50" is obtained when the symbols are consecutively stopped and displayed on the activated pay-line in the variable display devices 21 to 24 (in case of "4K" wherein the four symbols consecutively appear from the left end). Furthermore, an award "200" is obtained when the symbols are consecutively stopped and displayed on the activated pay-line in the variable display devices 21 to 25 (in case of "5K" wherein the fifth symbols consecutively appear from the left end).

Further, saying of the symbol "WORM", an award "6" is obtained when the symbols are consecutively stopped and displayed on the activated pay-line in the variable display devices 21 to 23 (in case of "3K" wherein the three symbols consecutively appear from the left end). Further, an award "40" is obtained when the symbols are consecutively stopped and displayed on the activated pay-line in the variable display devices 21 to 24 (in case of "4K" wherein the four symbols consecutively appear from the left end). Furthermore, an award "150" is obtained when the symbols are consecutively stopped and displayed on the activated pay-line in the variable display devices 21 to 25 (in case of "5K" wherein the five symbols consecutively appear from the left end).

Further, saying of the symbol "A" (alphabetic character), an award "5" is obtained when the symbols are consecutively stopped and displayed on the activated pay-line in the variable display devices 21 to 23 (in case of "3K" wherein the three symbols consecutively appear from the left end). Further, an award "25" is obtained when the symbols are consecutively stopped and displayed on the activated pay-line in the variable display devices 21 to 24 (in case of "4K" wherein the four symbols consecutively appear from the left end). Furthermore, an award "120" is obtained when the symbols are consecutively stopped and displayed on the activated pay-line in the variable display devices 21 to 25 (in case of "5K" wherein the five symbols consecutively appear from the left end).

Further, saying of the symbol "K" (alphabetic character), an award "5" is obtained when the symbols are consecutively stopped and displayed on the activated pay-line in the variable display devices 21 to 23 (in case of "3K" wherein the three symbols consecutively appear from the left end). Further, an award "25" is obtained when the symbols are consecutively stopped and displayed on the activated pay-line in the variable display devices 21 to 24 (in case of "4K" wherein the four symbols consecutively appear from the left end). Furthermore, an award "120" is obtained when the symbols are consecutively stopped and displayed on the activated pay-line in the variable display devices 21 to 25 (in case of "5K" wherein the five symbols consecutively appear from the left end).

Further, saying of the symbol "Q" (alphabetic character), an award "5" is obtained when the symbols are consecutively stopped and displayed on the activated pay-line in the variable display devices 21 to 23 (in case of "3K" wherein the three symbols consecutively appear from the left end). Further, an award "20" is obtained when the symbols are consecutively stopped and displayed on the activated pay-line in the variable display devices 21 to 24 (in case of "4K" wherein the four symbols consecutively appear from the left end). Furthermore, an award "100" is obtained when the symbols are consecutively stopped and displayed on the activated pay-line on the variable display devices 21 to 25 (in case of "5K" wherein the five symbols consecutively appear from the left end).

Further, saying of the symbol "3" (alphabetic character), an award "5" is obtained when the symbols are consecutively stopped and displayed on the activated pay-line in the variable display devices 21 to 23 (in case of "3K" wherein the three symbols consecutively appear from the left end). Further, an award "20" is obtained when the symbols are consecutively stopped and displayed on the activated pay-line in the variable display devices 21 to 24 (in case of "4K" wherein the four symbols consecutively appear from the left end). Furthermore, an award "100" is obtained when the symbols are consecutively stopped and displayed on the activated pay-line in the variable display devices 21 to 25 (in case of "5K" wherein the five symbols consecutively appear from the left end).

With the awards resulting from these symbols in alignment with the activated pay-lines, a total value of all the awards are added to the credit.

In the meanwhile, saying of the symbol "SARDINE", an award "2" is obtained in case of "2K" wherein the two symbols appear (in stop and display) on the variable display devices 21 to 25 regardless of the activated pay-line; an award "5" is obtained in case of "3K" wherein three symbols appear (in stop and display); an award "10" is obtained in case of "4K" wherein the four symbols appear (in stop and display); and an award "125" is obtained in case of "5K" wherein the five symbols appear (in stop and display).

Also, only the award, resulting from the symbol "SARDINE", allows a payout, obtained by a value of the award, shown in FIG. 13, multiplied by a total number of bets (a product of the number of bets multiplied by the number of activated pay-lines), to be added to the credit. In this moment, if an award also arises from the symbol aside from the symbol "SARDINE", such an award is also added to the credit.

Further, in respect of the symbol "SARDINE", if three or more symbols appear (in stop and display), the award, set forth above, is obtained regardless of the activated pay-line on the variable display devices 21 to 25, enabling the operation to shift to the bonus game.

Further, as used herein, the term "bonus game" refers to a game that is practiced after the base games have been conducted and there are many probabilities in general for a player to win on bonus games with advantages. Here, upon a shift to the bonus games, 15 to 25 games are automatically practiced, without betting credits or the like, depending on sortition outcomes during the transition to the bonus game.

By the way, when practicing the bonus game in the slot machine 1 of the presently filed embodiment, the column of the symbols, to be variably displayed over the scrolling variable display device 21 of the lower liquid crystal display 4, corresponds to the column of the symbols designated on the first reel strip 123 shown in FIG. 25; the column of the symbols, to be variably displayed over the scrolling variable display device 22 of the lower liquid crystal display 4, corresponds to the column of the symbols designated on the second reel strip 124 shown in FIG. 25; the column of the symbols variably, to be variably displayed over the scrolling variable display device 23 of the lower liquid crystal display 4, corresponds to the column of the symbols designated on the third reel strip 125 shown in FIG. 25; the column of the symbols variably, to be variably displayed over the scrolling variable display device 24 of the lower liquid crystal display 4, corresponds to the column of the symbols designated on the fourth reel strip 126 shown in FIG. 25; and the column of the symbols, to be variably displayed over the scrolling variable display device 25 of the lower liquid crystal display 4, corresponds to the column of the symbols designated on the fifth reel strip 127 shown in FIG. 25.

The rows of the symbols, designated on the reel strips 123 to 126 shown in FIG. 25, are identical to the rows of the symbols designated on the reel strips 101 to 104 shown in FIG. 12, which is used in the base game. On the contrary, the column of the symbols designated on the reel strip 127 shown in FIG. 25 is identical to the column of the symbols designated on the reel strip 105, shown in FIG. 12, which is used in the base game with the exception of the symbol "LOBSTER" to which the code No. "10" is allotted Also, the number of bets and the number of activated pay-lines at the time of the transition to the bonus game remains in the bonus game. Further, although the winning combination and the award used in the bonus game, are identical to those used in the base game mentioned above, the symbol "SHARK" is treated as the symbol "LOBSTER" and a play can be shifted to the bonus game again under situations where the three symbols "SARDINE" appear (in stop and display). Consequently, the player is able to have a lot of chances to get a large amount of credits.

Figure 19:
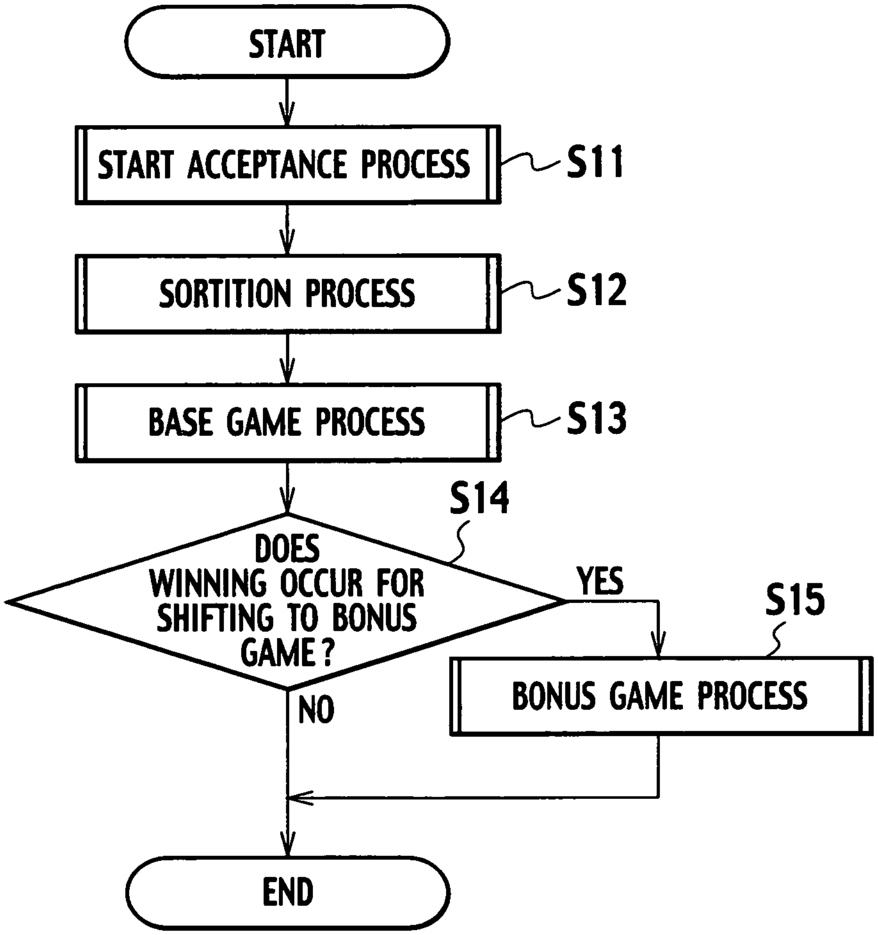
FIG. 19 is a flowchart of a main process program.

Next, a main process program, to be executed with the slot machine 1, is described below with reference to FIG. 19. FIG. 19 is a flowchart of the main process program. In FIG. 19, a start acceptance process, shown in FIG. 20 to be described below, is executed in step S (hereinafter abbreviated as "S") 11. The start acceptance process represents a process that allows the CPU 50 to accept switch signals delivered from the "1-BET" switch 57, the "2-BET" switch 58, the "3-BET" switch 59, the "5-BET" switch 60, the "8-BET" switch 61, the "1-LINE" switch 62, the "2-LINES" switch 63, the "5-LINES" switch 64, the "20-LINES" switch 65, the "25-LINES" switch 66 and the "BET RATE" switch 302 depending on the results on operations through the "BET1 PER LINE" button 33, the "BET2 PER LINE" button 34, the "BET3 PER LINE" button 35, the "BET5 PER LINE" button 36, the "BET8 PER LINE" button 37, the "RED PLAY1 LINE" button 39, the "PLAY2 LINES" button 40, the "PLAY5 LINES" button 41, the "PLAY20 LINES" button 42, the "BLACK PLAY25 LINES" button 43 or the "BET RATE" button 301, respectively.

Figure 21:
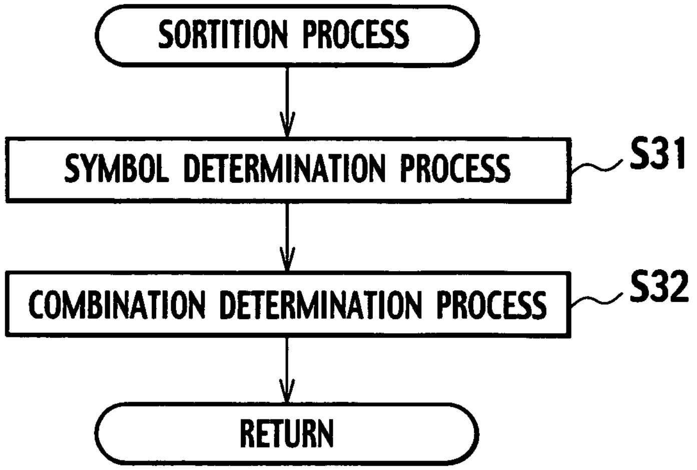
FIG. 21 is a flowchart of a sortition process program.

In S12, a sortition process, shown in FIG. 21 to be described later, is executed.

Also, if the winning occurs for shifting to the bonus game, a repetition frequency of the bonus games is determined. For example, the repetition frequency is selected from any of 10 to 25 games upon execution of the sortition.

Figure 22:
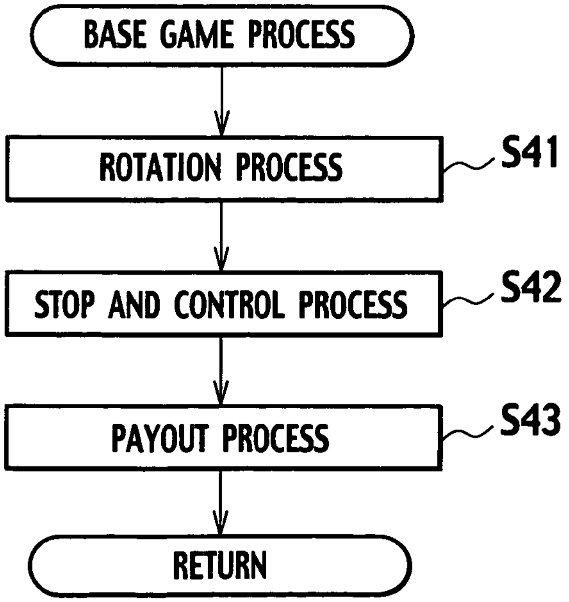
FIG. 22 is a flowchart of a base game process program.

In succeeding step S13, a base game process, shown in FIG. 22 to be described below, is executed. Subsequently, the operation proceeds to step S14 to make discrimination as to whether or not the winning occurs for shifting to the bonus game. More particularly, under circumstances where the sortition process in S12 reveals that three or more symbols "SARDINE" totally appear (in stop and display) on the variable display devices 21 to 25 regardless of the activated payline, the winning occurs for shifting to the bonus game (with "YES" in S14) and the operation goes to S15 thereby completing this main process program after a bonus game process, shown in FIG. 23 to be described later, has been completed. On the contrary, during the sortition process in S12, if three or more symbols "SARDINE" totally do not appear (in stop and display) on the variable display devices 21 to 25 regardless of the activated pay-line, no winning occurs for shifting to the bonus game (with "NO" in S14), thereby completing this main process program.

Figure 20:
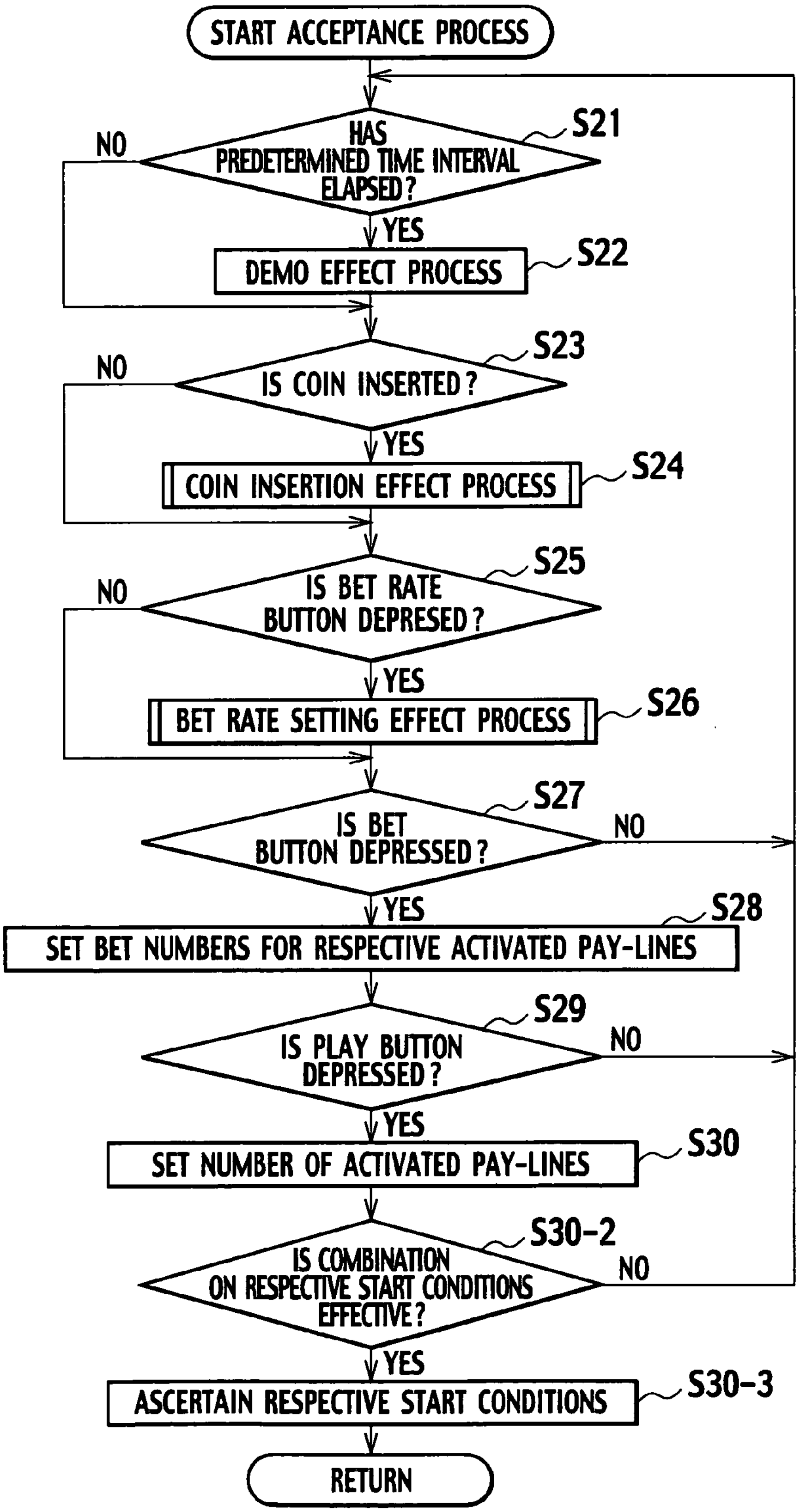
FIG. 20 is a flowchart of a start acceptance process program.

Now, the start acceptance process program, to be executed with the slot machine 1, is described below with reference to FIG. 20. FIG. 20 is a flowchart of the start acceptance process program. The start acceptance process program is executed in S11 for the main process program, shown in FIG. 19 mentioned above, and to this end, the operation goes to S21, shown in FIG. 20, to make discrimination as to whether or not a predetermined time interval (of, for instance, 15 seconds) has elapsed. This discrimination is executed based on an output of the clock pulse generating circuit 53. In this moment, if discrimination is made that no predetermined time interval has elapsed (with "NO" in S21), the operation goes to S23 doing nothing. In contrast, if discrimination is made that the predetermined time interval has elapsed (with "YES" in S21), the operation is executed in S22 to perform demo effects on the upper liquid crystal display 3 and the lower liquid crystal display 4, respectively, after which the operation goes to S23.

In S23, discrimination is made whether or not a coin (any of five kinds of coins involving a 5-cent coin, a 10-cent coin, 25-cent coin, a 50-cent coin and one dollar coin) is inserted into the coin insertion slot 9. This discrimination is executed based on a coin detection signal delivered from the coin sensor 49. In this moment, if discrimination is made that the coin (any of five kinds of coins involving a 5-cent coin, a 10-cent coin, 25-cent coin, a 50-cent coin and one dollar coin) is inserted into the coin insertion slot 9 (with "YES" in S23), a coin insertion effect process, shown in FIG. 1 described below, is executed in S24, after which the operation goes to S25. In contrast, if discrimination is made that no coin (any of five kinds of coins involving a 5-cent coin, a 10-cent coin, 25-cent coin, a 50-cent coin and one dollar coin) is inserted into the coin insertion slot 9 (with "NO" in S23), nothing is done and the operation goes to S25.

In S25, discrimination is made whether or not the "BET RATE" button 301 is pressed. This discrimination is executed based on a switch signal delivered from the "BET RATE" switch 302. In this moment, if discrimination is made that the "BET RATE" button 301 is pressed (with "YES" in S25), the operation is executed in S26 to perform a bet rate setting effect process, shown in FIG. 2 mentioned below, after which the operation goes to S27. On the contrary, if discrimination is made that no "BET RATE" button 301 is pressed (with "NO" in S25), nothing is done and the operation goes to S27.

In S27, discrimination is made whether or not any of the "BET" buttons 33 to 37 such as the "BET1 PER LINE" button 33, the "BET2 PER LINE" button 34, the "BET3 PER LINE" button 35, the "BET5 PER LINE" button 36 and the "BET8 PER LINE" button 37. This discrimination is executed based on a switch signal delivered from any of the "1-BET" switch 57, the "2-BET" switch 58, the "3-BET" switch 59, the "5-BET" switch 60 and the "8-BET" switch 61. In this moment, if discrimination is made that none of the BET buttons 33 to 37 is pressed (with "NO" in S27), the operation is routed back to S21 to repeatedly execute the operations set forth above. On the contrary, if discrimination is made that any of the "BET" buttons 33 to 37 is pressed (with "YES" in S27), the operation is executed in S28 to set the number of bets for the respective activated pay-lines based on those of the BET buttons 33 to 37 being pressed.

In S29, discrimination is made whether or not any of the "PLAY" buttons 39 to 43, such as the "RED PLAY1 LINE"

button 39, the "PLAY2 LINES" button 40, the "PLAY5 LINES" button 41, the "PLAY20 LINES" button 42 and the "BLACK PLAY25 LINES" button 43, is pressed. This discrimination is executed based on a switch signal delivered from any of the "1-LINE" switch 62, the "2-LINES" switch 63, the "5-LINES" switch 64, the "20-LINES" switch 65 and the "25-LINES" switch 66. In this moment, if discrimination is made that none of the "PLAY" buttons 39 to 43 is pressed (with "NO" in S29), the operation is routed back to S21 to repeatedly execute the operations set forth above. On the contrary, if discrimination is made that any of the "PLAY" buttons 39 to 43 is pressed (with "YES" in S29), the operation is executed in S30 to set the number of activated pay-lines based on pressed ones of the "PLAY" buttons 39 to 43, upon which the operation goes to S30-2.

In S30-2, discrimination is made whether or not a combination of various start conditions is active. This discrimination is made by judging whether or not the combination of the various start conditions, formed of the bet rate, the number of bets for the respective pay-lines and the number of activated pay-lines set in the process set forth above, is established with the number of current credits. When established with the number of current credits, the combination of the various start conditions is made active and if not, the combination of the various start conditions is made inactive. When this takes place, if discrimination is made that the combination of the various start conditions is made inactive (with "NO" in S30-2), the operation is routed back to S21 for repeatedly executing the operations set forth above. In contrast, if discrimination is made that the combination of the various start conditions is made active (with "YES" in S30-2), the operation goes to S30-3 for determining the various conditions for the bet rate, the bet rate for each activated pay-line and the number of activated pay-lines and even in the course of the demo effects mentioned above, the operation is returned to the main process program, shown in FIG. 19 described above, upon which the operation proceeds to the sortition process in S12.

Next, the coin insertion effect process program, to be executed in S24 shown in FIG. 20 described above, is described with reference to FIG. 1. FIG. 1 is a flowchart of the coin insertion effect process program. That is, the coin insertion effect process program is executed in S24 of the start acceptance process program, shown in FIG. 20 mentioned above, and to this end, the operation initially goes to S101 to obtain kinds of coins (any of five kinds of coins involving a 5-cent coin, a 10-cent coin, 25-cent coin, a 50-cent coin and one dollar coin) inserted into the coin insertion slot 9 in response to the coin detection signal delivered from the coin sensor 49.

If the operation goes to S102 after the operation has been executed in S101, the speaker 80 is activated to output insertion sounds depending on the kind of inserted coins (any of five kinds of coins involving a 5-cent coin, a 10-cent coin, 25-cent coin, a 50-cent coin and one dollar coin). When this takes place, the CPU 50 commands the sound control CPU 312 to select the insertion sounds based on the coin insertion sound selection table 351 described in FIG. 3, causing the resulting insertion sound to be outputted from the speaker 80. Concretely speaking, if a 5-cent coin is inserted into the coin insertion slot 9, then the sound control CPU 312 selects the first insertion sound and the first insertion sound is outputted from the speaker 80. If a 10-cent coin is inserted into the coin insertion slot 9, then the sound control CPU 312 selects the second insertion sound and the second insertion sound is outputted from the speaker 80. If a 25-cent coin is inserted into the coin insertion slot 9, then the sound control CPU 312 selects the third insertion sound and the third insertion sound is outputted from the speaker 80. If a 50-cent coin is inserted into the coin insertion slot 9, then the sound control CPU 312 selects the fourth insertion sound and the fourth insertion sound is outputted from the speaker 80. If one dollar coin is inserted into the coin insertion slot 9, then the sound control CPU 312 selects the fifth insertion sound and the fifth insertion sound is outputted from the speaker 80.

One example of the insertion sound, to be outputted from the speaker 80, includes a voice to notify a player with information of a kind of inserted coins, a sound effect depending on the kind of inserted coins.

If the kind of coin inserted into the coin insertion slot 9 is a 5-cent coin, then the content of a voice to be outputted for informing the kind of coin includes an output of the speaker 80 notifying a player with "FIVE-CENT COIN HAS BEEN INSERTED". If a 10-cent coin is inserted into the coin insertion slot 9, then a voice "TEN-CENT COIN HAS BEEN INSERTED" is outputted from the speaker 80. If a 25-cent coin is inserted into the coin insertion slot 9, then a voice "TWENTY FIVE-CENT COIN HAS BEEN INSERTED" is outputted from the speaker 80. If a 50-cent coin is inserted into the coin insertion slot 9, then a voice "FIFTY-CENT COIN HAS BEEN INSERTED" is outputted from the speaker 80. If one dollar coin is inserted into the coin insertion slot 9, then a voice "ONE DOLLAR COIN HAS BEEN INSERTED" is outputted from the speaker 80.

Further, if the kind of coin inserted into the coin insertion slot 9 is a 5-cent coin, the content of the sound effect depending on the kind of the coin includes an output of the speaker 80 giving a ring of a bell outputted one time. If a 10-cent coin is inserted into the coin insertion slot 9, the ring of a bell is outputted from the speaker 80 twice. If a 25-cent coin is inserted into the coin insertion slot 9, the ring of a bell is outputted from the speaker 80 three times. If a 50-cent coin is inserted into the coin insertion slot 9, the ring of a bell is outputted from the speaker 80 four times. If one dollar coin is inserted into the coin insertion slot 9, the ring of a bell is outputted from the speaker 80 five times. Further, in an alternative, the kind of coins may be correlated to different melodies (insertion sounds) on one-to-one level to allow the speaker 80 to output the melodies in correspondence with the kinds of the coins inserted into the coin insertion slot 9, respectively.

Also, the coin insertion sound selection table 351 is stored in the sound ROM 314 mounted on the sound output circuit board 311.

With such a structure mentioned above, the sound control CPU 312 plays a role as an "insertion sound controller" when executing the operation in S102.

If the operation goes to S103 after the operation has been executed in S102, the upper liquid crystal display 3 provides a display of insertion images depending on the kinds of inserted coins (any of five kinds of coins involving a 5-cent coin, a 10-cent coin, 25-cent coin, a 50-cent coin and one dollar coin). When this takes place, the CPU 50 commands the image control CPU 83 to select an insertion image based on the coin insertion image selection table 352 described in FIG. 4, thereby permitting the insertion image to be displayed over the upper liquid crystal display 3. More particularly, if the kind of the coin inserted into the coin insertion slot 9 is a 5-cent coin, the image control CPU 83 selects the first insertion image, which in turn is displayed over the upper liquid crystal display 3. If a 10-cent coin is inserted into the coin insertion slot 9, the image control CPU 83 selects the second insertion image, which in turn is displayed over the upper liquid crystal display 3. If a 25-cent coin is inserted into the coin insertion slot 9, the image control CPU 83 selects the third insertion image, which in turn is displayed over the upper liquid crystal display 3. If a 50-cent coin is inserted into the coin insertion slot 9, the image control CPU 83 selects the fourth insertion image, which in turn is displayed over the upper liquid crystal display 3. If one dollar coin is inserted into the coin insertion slot 9, the image control CPU 83 selects the fifth insertion image, which in turn is displayed over the upper liquid crystal display 3.

Figure 7A:
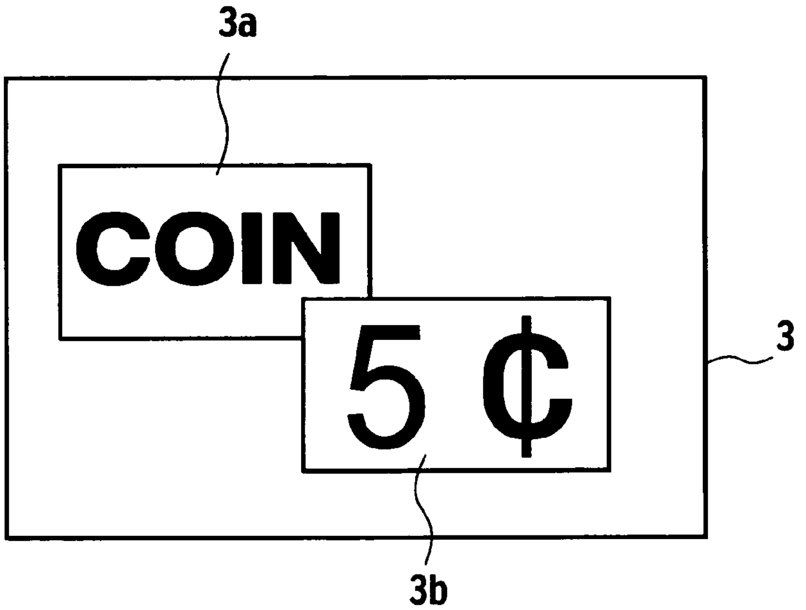
FIGS. 7A and 7B are views showing display examples of an upper liquid crystal display, with FIG. 7A showing one example of an insertion image and FIG. 7B showing one example of a setting image.

FIG. 7A shows one example of an insertion image to be displayed over the upper liquid crystal display 3. FIG. 7A is a view showing one example of the first insertion image to be displayed over the upper liquid crystal display 3 under a situation where the kind of coin inserted into the coin insertion slot 9 is a 5-cent coin. The first insertion image, shown in FIG. 7A, is comprised of a display frame 3*a* displayed over the upper liquid crystal display 3, a character "COIN" displayed within the display frame 3*a*, a display frame 3*b* displayed over the upper liquid crystal display 3, and a character "5¢" displayed within the display frame 3*b*. Such a concept may be similarly applied to the other insertion images, though not shown. One example of the second insertion image has a character "10¢" displayed within the display frame 3*b*; one example of the third insertion image has a character "25¢" displayed within the display frame 3*b*; one example of the fourth insertion image has a character "50¢" displayed within the display frame 3*b*; and one example of the fifth insertion image has a character "1$" displayed within the display frame 3*b*. Further, in an alternative, the kinds of all different coins may be correlated to different images (insertion images) on one-to-one level, respectively, to allow an image, present in correspondence to the kind of coin inserted into the coin insertion slot 9, to be displayed over the upper liquid crystal display 3.

Moreover, the coin insertion image selection table 352 is stored in the image ROM 82 mounted on the liquid crystal driving circuit board 87.

Thus, the image control CPU 83 plays a role as an "insertion image control device" when executing the operation in S103.

The bet rate setting effect process program to be executed in S26 shown in FIG. 20, set forth above, is described with reference to FIG. 2. FIG. 2 is a flowchart of the bet rate setting effect process program. That is, the bet rate setting effect process program is executed in S26 on the start acceptance process program shown in FIG. 20 and, to this end, the operation goes to S111, shown in FIG. 2, wherein the operation is executed to obtain the bet rate (any of "5-cent", "10-cent", "25-cent", "50-cent" and "one dollar") set in the "BET RATE" button 301 based on the switch signal from the "BET RATE" switch 302.

As the operation goes to S112 after the operation has been executed in S111 set forth above, the speaker 80 outputs an insertion sound depending on the bet rate (any of "5-cent", "10-cent", "25-cent", "50-cent" and "one dollar"). When this takes place, the CPU 50 commands the sound control CPU 312 to select a setting sound based on the bet rate setting sound selection table 353, described in FIG. 5, to allow the setting sound to be outputted from the speaker 80. More particularly, under circumstances where the bet rate set with the "BET RATE" button 301 is "5-cent", the sound control CPU 312 selects the first setting sound, which in turn is outputted from the speaker 80. When the bet rate set with the "BET RATE" button 301 is "10-cent", the sound control CPU 312 selects the second setting sound, which in turn is outputted from the speaker 80. When the bet rate set with the "BET RATE" button 301 is "25-cent", the sound control CPU 312 selects the third setting sound, which in turn is outputted from the speaker 80. When the bet rate set with the "BET RATE" button 301 is "50-cent", the sound control CPU 312 selects the fourth setting sound, which in turn is outputted from the speaker 80. When the bet rate set with the "BET RATE" button 301 is "one dollar", the sound control CPU 312 selects the fifth setting sound, which in turn is outputted from the speaker 80.

One example of the setting sounds, to be outputted from the speaker 80, may include a voice notifying the bet rate, a sound effect associated with the bet rate, etc.

If the bet rate set with the "BET RATE" button 301 is "5-cent", the content of the voice, by which the bet rate is notified, the speaker 80 is allowed to output a voice "BET RATE WITH 5-CENT IS SET". If the bet rate set with the "BET RATE" button 301 is "10-cent", a voice "BET RATE WITH 10-CENT IS SET" is outputted from the speaker 80. If the bet rate set with the "BET RATE" button 301 is "25-cent", a voice "BET RATE WITH 25-CENT IS SET" is outputted from the speaker 80. If the bet rate set with the "BET RATE" button 301 is "50-cent", a voice "BET RATE WITH 50-CENT IS SET" is outputted from the speaker 80. If the bet rate set with the "BET RATE" button 301 is "one dollar", a voice "BET RATE WITH ONE DOLLAR IS SET" is outputted from the speaker 80.

Further, if the bet rate set with the "BET RATE" button 301 is "5-cent", for instance, the content of a sound effect associated with the bet rate allows the speaker 80 to output a sound tone of a drum once. If the bet rate set with the "BET RATE" button 301 is "10-cent", for instance, the speaker 80 outputs sound tones of the drum twice. If the bet rate set with the "BET RATE" button 301 is "25-cent", for instance, the speaker 80 outputs sound tones of the drum three times. If the bet rate set with the "BET RATE" button 301 is "50-cent", for instance, the speaker 80 outputs sound tones of the drum four times. If the bet rate set with the "BET RATE" button 301 is "one dollar", for instance, the speaker 80 outputs sound tones of the drum five times. Moreover, all the different melodies (setting sounds) may be correlated to the bet rates on one-to-one level, respectively, to allow the speaker 80 to output a melody in correspondence to the bet rate set with the "BET RATE" button 301.

Also, the bet rate setting sound selection table 353 is stored in the sound ROM 314 mounted on the sound output circuit board 311.

Thus, the sound control CPU 312 plays a role as a "setting sound control device" when executing the operation in S112.

As the operation goes to S113 after the operation has been executed in S112 set forth above, the upper liquid crystal display 3 provides a display of the setting image associated with the bet rate (any of "5-cent", "10-cent", "25-cent", "50-cent" and "one dollar"). When this takes place, the CPU 50 commands the image control CPU 83 to select a setting image based on the bet rate setting image selection table 354, described in FIG. 6, to allow the setting image to be displayed over the upper liquid crystal display 3. More particularly, under circumstances where the bet rate set with the "BET RATE" button 301 is "5-cent", the image control CPU 83 selects the first setting image, which in turn is displayed over the upper liquid crystal display 3. When the bet rate set with the "BET RATE" button 301 is "10-cent", the image control CPU 83 selects the second setting image, which in turn is displayed over the upper liquid crystal display 3. When the bet rate set with the "BET RATE" button 301 is "25-cent", the image control CPU 83 selects the third setting image, which in turn is displayed over the upper liquid crystal display 3. When the bet rate set with the "BET RATE" button 301 is "50-cent", the image control CPU 83 selects the fourth setting image, which in turn is displayed over the upper liquid crystal display 3. When the bet rate set with the "BET RATE" button 301 is "one dollar", the image control CPU 83 selects the fifth setting image, which in turn is displayed over the upper liquid crystal display 3.

Figure 7B:
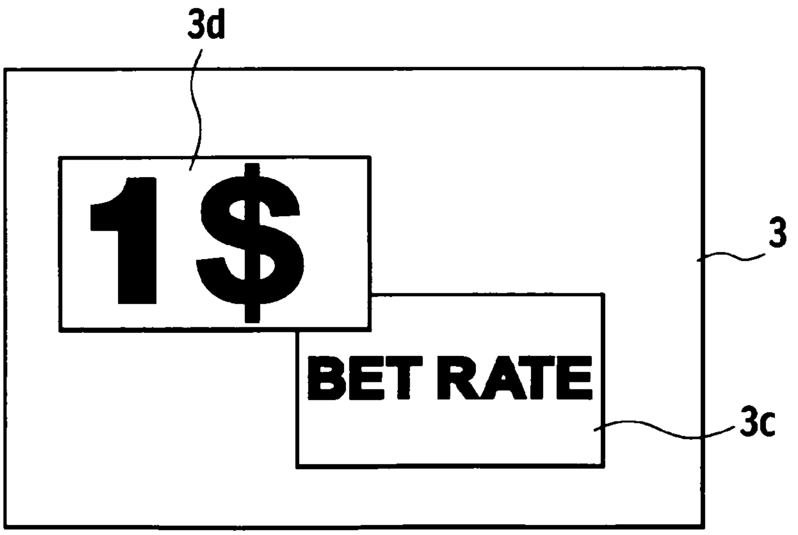

FIG. 7B shows one example of the setting image to be displayed over the upper liquid crystal display 3. FIG. 7B is a view showing one example of the fifth setting image to be displayed over the upper liquid crystal display 3 under a situation where the bet rate, set with the "BET RATE" button 301, is "1$". The fifth setting image, shown in FIG. 7B, is comprised of a display frame 3*c* provided in display over the upper liquid crystal display 3, a character "BET RATE" displayed within the display frame 3*c*, a display frame 3*d* provided in display over the upper liquid crystal display 3, and a character "1$" displayed within the display frame 3*d*. Such a concept may be similarly applied to the other setting images, though not shown, and the first setting image may have a character "5¢" to be displayed within the display frame 3*d*; the second setting image may have a character "10¢" to be displayed within the display frame 3*d*; and the third setting image may have a character "50¢" to be displayed within the display frame 3*d*. Further, in an alternative, all the different images (setting images) may be correlated to the bet rates on one-to-one level, respectively, to allow an image, present in correspondence to the bet rate set with the "BET RATE" button 301, to be displayed over the upper liquid crystal display 3.

Moreover, the bet rate setting image selection table 354 is stored in the image ROM 82 mounted on the liquid crystal driving circuit board 87.

Thus, the image control CPU 83 plays a role as a "setting image control device" when executing the operation in S113.

The sortition process program, to be executed with the slot machine 1, is described with reference to FIG. 21. FIG. 21 is a flowchart of the sortition process program. The sortition process program is executed in S12 of the main process program shown in FIG. 19, set forth above, and to this end, the operation goes to S31, shown in FIG. 21, wherein a symbol determination process is executed. Here, with the base game, symbols, to be stopped and displayed in alignment with the first pay-line L1, are determined for the variable display devices 21 to 25, respectively. More particularly, five random numbers are subjected to the sampling with the random number sampling circuit 56 in correlation to the respective variable display devices 21 to 25 as set forth above, thereby determining stop and display symbols based on the sortition table shown in FIG. 14 in terms of the code No. As a symbol to be stopped and displayed in alignment with the activated pay-line is determined, a combination determination process is executed in S32 after which the operation is returned to the main process program shown in FIG. 19, mentioned above, and the operation goes to the regular process in S13. Moreover, with the combination determination process, in particular, a winning combination and associated award are determined based on the table shown in FIG. 13 in terms of the code No. in S31 as set forth above.

Next, the base game process program, to be executed with the slot machine 1, is described with reference to FIG. 22. FIG. 22 is a flowchart of the base game process program. The base game process program is executed in S13 of the main process program shown in FIG. 19 and to this end, the scrolling of various symbols are performed in S41, shown in FIG. 22, with the variable display devices 21 to 25. When this takes place, a player feels that immediately after any of the "PLAY" buttons 39 to 43, among the "RED PLAY1 LINE" button 39, the "PLAY2 LINES" button 40, the "PLAY5 LINES" button 41, the "PLAY20 LINES" button 42 and the "BLACK PLAY25 LINES" button 43, has been pressed, the scrolling of the various symbols have been started with the variable display devices 21 to 25.

In S42, the operation is executed to stop the scrolling of the various symbols with the variable display devices 21 to 25 by which the symbols have been scrolling.

In S43, the operation is executed to pay out the credit in value corresponding to an award determined based on the table, shown in FIG. 13, in accordance with a symbol combination of a winning combination, which is stopped and displayed in S42 with the variable display devices 21 to 25. Also, after the operation in S43 has been executed, the operation is returned to the main process program, shown in FIG. 19, for executing a determination process in S14.

Figure 23:
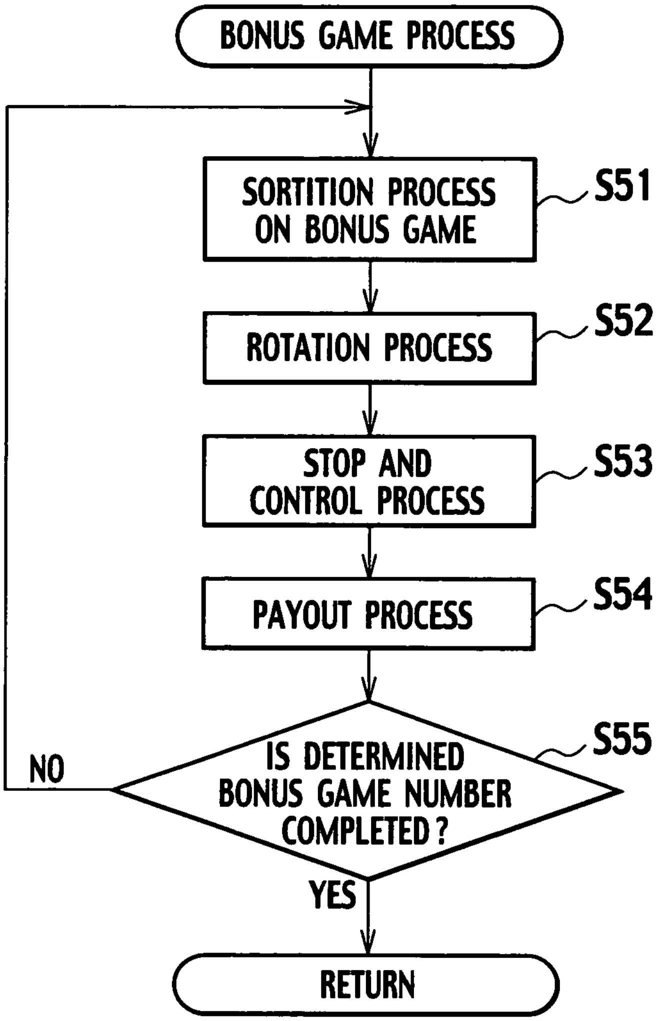
FIG. 23 is a flowchart of a bonus game process program.

Now, the bonus game process program to be executed by the slot machine 1 is disclosed with reference to FIG. 23. FIG. 23 is a flowchart of the bonus game process program. If discrimination is made that the winning occurs for shifting to a bonus game in the main process program, shown in FIG. 19, executed in S14 (with "YES" in S14), the operation goes to S15 in FIG. 19 to execute the bonus game process program and to this end, the operation initially goes to S51 in FIG. 23 to execute the sortition process during the bonus game. During the bonus game, symbols, to be stopped and displayed in alignment with the first pay-line L1, are determined for the variable display devices 21 to 25, respectively. More particularly, as set forth above, five random numbers are subjected to the sampling with the random number sampling circuit 56 in a way to be correlated with the variable display devices 21 to 25, respectively, thereby determining stop and display symbols in terms of the code No. based on the sortition table shown in FIG. 14. Upon determination of the symbols to be stopped and displayed on the relevant pay-line, a winning combination and associated award are determined in terms of the code No. based on the table shown in FIG. 13.

During a rotation process in S52, the symbols are automatically scrolled with the variable display devices 21 to 25, respectively.

During a stop and control process in S53, the scrolling of the symbols are automatically stopped on the respective variable display devices 21 to 25 with the symbols scrolling.

During a payout process in S54, the operation is executed to pay out credits in value equivalent to the award determined based on the table (the symbol "SHARK" is dealt with as the symbol "LOBSTER" here) in accordance with a symbol combination stopped and displayed on the variable display devices 21 to 25 in S53.

Subsequently, the operation goes to S55 and discrimination is made whether or not the execution times of the bonus game reaches the number of times determined in S12 of FIG. 19 set forth above. When this takes place, if discrimination is made that the execution times of the bonus game does not reach the number of times determined in S12 of FIG. 19 (with "NO" in S55), the operation goes to S51 to repeatedly execute the operations mentioned above. In contrast, if discrimination is made that the execution times of the bonus game reaches the number of times determined in S12 of FIG. 19 (with "YES" in S55), the bonus game process is completed.

Also, if the winning occurs for shifting to the bonus game, the repetition times of the bonus game are newly determined to allow the determined repetition times to be added to the "times determined in S12 of FIG. 19 set forth above" during discrimination in S55. This enables the operation to shift to the bonus game again upon winning on the bonus game during the bonus game. More particularly, for instance, under circumstances where the operation shifts to the bonus game of twenty times, if the winning occurs for shifting to the bonus game for seventeen times at a twelfth bonus game, then, the bonus game is executed on twenty-five times (=20 times−12 times+17 times).

Further, if the player finally had a capability to get the credits on the bonus game, a double down game is performed betting the relevant credits, after the relevant bonus games have been finished, and description of this point is herein omitted.

As set forth above in detail, with the slot machine 1 of the presently filed embodiment, if one of the kinds of the 5-cent coin, the 5-cent coin, the 10-cent coin, the 25-cent coin, the 50-cent coin and one dollar coin is inserted into the coin insertion slot 9, the coin sensor 49 discriminates the kind of the coin (a 5-cent coin, a 10-cent coin, 25-cent coin, a 50-cent coin or one dollar coin) inserted into the coin insertion slot 9 (S23), the sound control CPU 312 selects an insertion sound (any of the first insertion sound, the second insertion sound, the third insertion sound, the fourth insertion sound and the or fifth insertion sound), outputted from the speaker 80, depending on the kind of coin (a 5-cent coin, a 10-cent coin, 25-cent coin, a 50-cent coin or one dollar coin) discriminated by the coin sensor 49 (S102). This enables the player to discriminate the kind of the coin (a 5-cent coin, a 10-cent coin, 25-cent coin, a 50-cent coin or one dollar coin) inserted into the coin insertion slot 9 with the insertion sound (the first insertion sound, the second insertion sound, the third insertion sound, the fourth insertion sound or the fifth insertion sound).

Further, by replacing or adding a whole of the sound output circuit board 311, on which the sound ROM 314 storing the coin insertion sound selection table 351 is mounted, the coin insertion sound selection table 351, which is referred to in S102 by the sound control CPU 312, can be simultaneously replaced or added. Thus, the correlation between the kinds of coins (a 5-cent coin, a 10-cent coin, 25-cent coin, a 50-cent coin or one dollar coin), to be inserted into the coin insertion slot 9, and the kinds of insertion sounds (the first insertion sound, the second insertion sound, the third insertion sound, the fourth insertion sound or the fifth insertion sound) can be altered upon replacing or adding the sound output circuit board 311 in simple work.

Furthermore, with the slot machine 1 of the presently filed embodiment, if the bet rate (any of "5-cent", "10-cent", "25-cent", "50-cent" and "one dollar") is set with the "BET RATE" button 301 (S25), the setting sound (any of the first setting sound, the second setting sound, the third setting sound, the fourth setting sound and the fifth setting sound), to be outputted from the speaker 80, is selected depending on the bet rate (any of "5-cent", "10-cent", "25-cent", "50-cent" and "one dollar") set with the "BET RATE" button 301 (S112). This enables the player to discriminate the bet rate (any of "5-cent", "10-cent", "25-cent", "50-cent" and "one dollar"), set with the "BET RATE" button 301, with the occurrence of the setting sound (any of the first setting sound, the second setting sound, the third setting sound, the fourth setting sound and the fifth setting sound).

Moreover, by replacing or adding a whole of the sound output circuit board 311, on which the sound ROM 314 storing the setting sound selection table 353 is mounted, the bet rate setting sound selection table 353, which is referred to in S112 by the sound control CPU 312, can be simultaneously replaced or added. Thus, the correlation between the bet rates (any of "5-cent", "10-cent", "25-cent", "50-cent" and "one dollar"), to be set with the "BET RATE" button 301, and the kinds of setting sounds (any of the first setting sound, the second setting sound, the third setting sound, the fourth setting sound and the fifth setting sound), to be outputted from the speaker 80, can be altered upon replacing or adding the sound output circuit board 311 in simple work.

In addition, with the slot machine 1 of the presently filed embodiment, if one of the kinds of the 5-cent coin, the 10-cent coin, the 25-cent coin, the 50-cent coin and one dollar coin is inserted into the coin insertion slot 9, the coin sensor 49 discriminates the kind of coin (a 5-cent coin, a 10-cent coin, 25-cent coin, a 50-cent coin or one dollar coin) inserted into the coin insertion slot 9 (S23), the image control CPU 83 selects an insertion image (the first insertion image, the second insertion image, the third insertion image, the fourth insertion image or the fifth insertion image), to be displayed over the upper liquid crystal display 3, depending on the kind of coin (a 5-cent coin, a 10-cent coin, 25-cent coin, a 50-cent coin or one dollar coin) discriminated by the coin sensor 49 (S103). This enables the player to discriminate the kind of coin (a 5-cent coin, a 10-cent coin, 25-cent coin, a 50-cent coin or one dollar coin) inserted into the coin insertion slot 9 with the insertion image (the first insertion image, the second insertion image, the third insertion image, the fourth insertion image or the fifth insertion image) on the kind of coin inserted into the coin insertion slot 9.

Moreover, by replacing or adding a whole of the liquid crystal driving circuit board 87, on which the image ROM 82 storing the coin insertion image selection table 352 is mounted, the coin insertion image selection table 352, which is referred to in S103 by the image control CPU 83, can be simultaneously replaced or added. Thus, the correlation between the kinds of coins (a 5-cent coin, a 10-cent coin, 25-cent coin, a 50-cent coin or one dollar coin), to be inserted into the coin insertion slot 9, and kinds of insertion images (the first insertion image, the second insertion image, the third insertion image, the fourth insertion image or the fifth insertion image), to be displayed over the upper liquid crystal display 3, can be altered upon replacing or adding the liquid crystal driving circuit board 87 in simple work.

Furthermore, with the slot machine 1 of the presently filed embodiment, if the bet rate (any of "5-cent", "10-cent", "25-cent", "50-cent" and "one dollar") is set with the "BET RATE" button 301 (S25), the setting image (the first setting image, the second setting image, the third setting image, the fourth setting image or the fifth setting image), to be displayed over the upper liquid crystal display 3, is selected depending on the bet rate (any of "5-cent", "10-cent", "25-cent", "50-cent" and "one dollar") set with the "BET RATE" button 301 (S113). This enables the player to discriminate the bet rate (any of "5-cent", "10-cent", "25-cent", "50-cent" and "one dollar"), set with the "BET RATE" button 301, with the setting image (the first setting image, the second setting image, the third setting image, the fourth setting image or the fifth setting image).

Moreover, by replacing or adding a whole of the liquid crystal driving circuit board 87, on which the image ROM 82 storing the bet rate setting image selection table 354 is mounted, the bet rate setting image selection table 354, which is referred to by the image control CPU 83, can be simultaneously replaced or added. Thus, the correlation between the bet rates (any of "5-cent", "10-cent", "25-cent", "50-cent" and "one dollar"), to be set with the "BET RATE" button 301, and kinds of setting images (the first setting image, the second setting image, the third setting image, the fourth setting image or the fifth setting image), to be displayed over the upper liquid crystal display 3, can be altered upon replacing or adding the liquid crystal driving circuit board 87 in simple work.

Also, the present invention is not limited to the embodiment, set forth above, and various modifications and changes may be made thereto without departing from a scope of the present invention.

For instance, while the slot machine 1 of the presently filed embodiment is configured in a structure wherein: the speaker 80 provides the insertion sound (the first insertion sound, the second insertion sound, the third insertion sound, the fourth insertion sound or the fifth insertion sound) in correlation to the kind of coin (a 5-cent coin, a 10-cent coin, 25-cent coin, a 50-cent coin or one dollar coin) discriminated with the coin sensor 49 (S102); the speaker 80 provides the setting sounds (the first setting sound, the second setting sound, the third setting sound, the fourth setting sound or the fifth setting sound) in correlation to the bet rate ("5-cent", "10-cent", "25-cent", "50-cent" or "one dollar") set with the "BET RATE" button 301; the upper liquid crystal display 3 provides a display of the insertion image (the first insertion image, the second insertion image, the third insertion image, the fourth insertion image or the fifth insertion image) in correlation to the kind of coin (a 5-cent coin, a 10-cent coin, 25-cent coin, a 50-cent coin or one dollar coin) discriminated with the coin sensor 49 (S103); the upper liquid crystal display 3 provides a display of the setting image (the first setting image, the second setting image, the third setting image, the fourth setting image or the fifth setting image) in correlation to the bet rate ("5-cent", "10-cent", "25-cent", "50-cent" or "one dollar") set with the "BET RATE" button 301 (S113). No need arises for all of the controls, related to the insertion sound, the setting sound, the insertion image and the setting image, to be combined in operation and the controls, mentioned above, may be executed for at least the operations related to the setting sound or the setting image.

Under a situation where the slot machine 1 is configured to perform the control, associated with the insertion sound or insertion image related to the insertion of the coin, with no control executed for the setting sound or setting image related to the setting of the bet rate, a single bet rate may be determined.

Besides, under a situation where the slot machine 1 is configured in another structure with no ability to perform the control, associated with the insertion sound or insertion image related to the insertion of the coin, but with an ability to perform the control associated with the setting sound or setting image related to the setting of the bet rate, a kind of coin, to be inserted into the coin insertion slot 9, may be a single coin.

Also, while the slot machine 1 of the presently filed embodiment is configured in a structure wherein the insertion image (the first insertion image, the second insertion image, the third insertion image, the fourth insertion image or the fifth insertion image) and the setting image (the first setting image, the second setting image, the third setting image, the fourth setting image or the fifth setting image) are displayed over the upper liquid crystal display 3, these contents may be displayed over the lower liquid crystal display 4.

Further, with the slot machine 1 of the presently filed embodiment, for the base game and the bonus game, the symbols, to be stopped and displayed on the pay-line formed of the second stop and display areas 212, 222, 232, 242, 252 of the variable display devices 21 to 25, are determined for the variable display devices 21 to 25, respectively, using the sortition table, shown in FIG. 14, in which one of the random number values, resulting from the sampling with the random number sampling circuit 56, and one of the code Nos., are correlated. However, the symbols, to be stopped and displayed on the pay-line formed of the second stop and display areas 212, 222, 232, 242, 252 of the variable display devices 21 to 25, may be determined for the variable display devices 21 to 25, respectively, using the sortition table, shown in FIG. 24, in which a specified range of the random number values, resulting from the sampling with the random number sampling circuit 56, and one of the code Nos., are correlated.

Furthermore, although the slot machine 1 of the presently filed embodiment has been described in conjunction with a structure wherein the games of the video-slot with five reels are practiced, it may be altered in such a way to practice the games of the video-slot with three reels or nine reels.

Moreover, with the slot machine 1 of the presently filed embodiment, the sound ROM 314 mounted on the sound output circuit board 311, is arranged to store the insertion sound (the first insertion sound, the second insertion sound, the third insertion sound, the fourth insertion sound and the fifth insertion sound), to be outputted from the speaker 80 in correlation to the kind of coin (a 5-cent coin, a 10-cent coin, 25-cent coin, a 50-cent coin or one dollar coin) inserted into the coin insertion slot 9, and the setting sound (the first setting sound, the second setting sound, the third setting sound, the fourth setting sound and the fifth setting sound), to be outputted from the speaker 80 in correlation to the bet rate ("5-cent", "10-cent", "25-cent", "50-cent" or "one dollar") set with the "BET RATE" button 301, while the image ROM 82, mounted on the liquid crystal driving circuit board 87, is arranged to store the insertion image (the first insertion image, the second insertion image, the third insertion image, the fourth insertion image and the fifth insertion image), to be displayed over the upper liquid crystal display 3 in correlation to the kind of coin (a 5-cent coin, a 10-cent coin, 25-cent coin, a 50-cent coin or one dollar coin) inserted into the coin insertion slot 9, and the setting image (the first setting image, the second setting image, the third setting image, the fourth setting image and the fifth setting image) to be displayed over the upper liquid crystal display 3 in correlation to the bet rate ("5-cent", "10-cent", "25-cent", "50-cent" or "one dollar") set with the "BET RATE" button 301.

Figure 27:
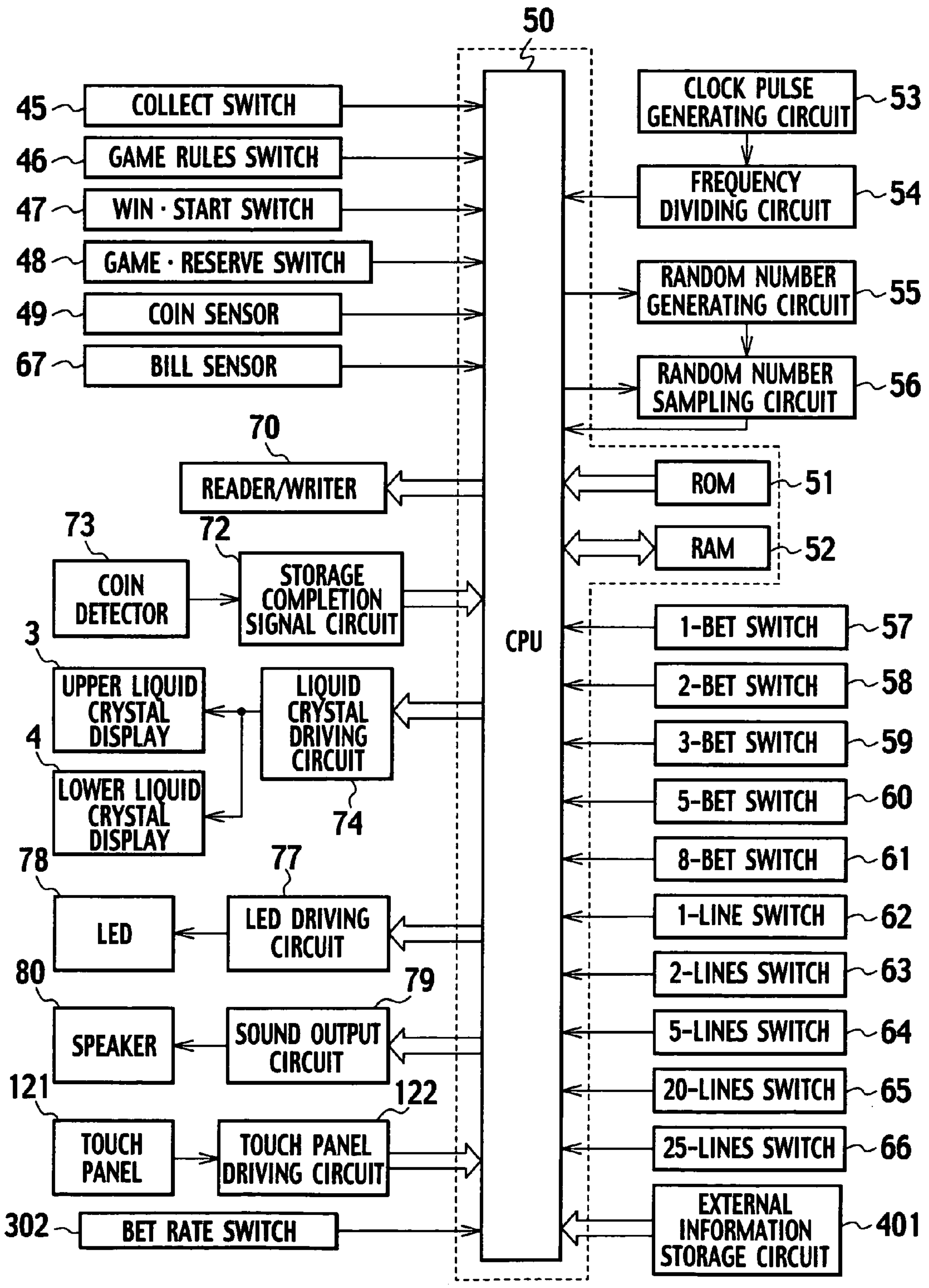
FIG. 27 is a block diagram typically showing a control system of the slot machine.

In contrast to such an arrangement, as shown in FIG. 27, the slot machine 1 of the presently filed embodiment may be configured to further include an external information storage circuit 401, which is simply and detachably connectable via an expansion slot (not shown) and includes a storage device (such as, for instance, a flush memory like a Compact Flush (under a registered Trade Mark) or the like and a ROM, etc.) that stores the insertion sound, the setting sound, the insertion image and the setting image, which are mentioned above, thereby permitting these contents to be downloaded to the work RAM 315 mounted on the sound output circuit board 311, and the work RAM 84 mounted on the liquid crystal driving circuit board 87.

What is claimed is:

1. A gaming machine comprising:

a bet number setting device configured to set a number of bets based on a bet rate which is a value of game medium needed for increasing the number of bets by one;

a bet rate setting device configured to change and set the bet rate to a selected bet rate among a plurality of predetermined bet rates in accordance with an operation of a bet rate setting switch by a player, wherein the bet rate setting device is separate from the bet number setting device;

a setting sound control device configured to select a setting sound from a plurality of different sounds depending on the bet rate set by the bet rate setting device, a different sound being selected for a different bet rate;

a setting sound output device configured to output the setting sound selected by the setting sound control device when the bet rate is set by the bet rate setting device in accordance with the operation of the bet rate setting switch by the player; and a game medium insertion section configured to receive a plurality of types of gaming mediums of different values, wherein, in accordance with the operation of the bet rate setting switch by the player, the bet rate setting device sequentially changes the bet rate from a lowest rate to a highest rate and returns the bet rate to the lowest rate from the highest rate at once, thereby the bet rate being cyclically altered.

2. The gaming machine according to claim 1, further comprising:

a setting sound storage device storing a setting sound table, in which the bet rate and a kind of setting sounds are correlated to each other and which is referred to by the setting sound control device; and a setting sound table board on which the setting sound storage device is mounted and which is detachably connected to the gaming machine.

3. The gaming machine according, to claim 1, further comprising:

a setting image output device outputting a setting image when the bet rate is set by the bet rate setting device; and a setting image control device controlling the setting image, to be outputted from the setting image output device, depending on the bet rate set by the bet rate setting device.

4. A gaming machine comprising:

a bet number setting device configured to set a number of bets based on a bet rate which is a value of game medium needed for increasing the number of bets by one;

a bet rate setting device configured to change and set the bet rate to a selected bet rate among a plurality of predetermined bet rates in accordance with an operation of a bet rate setting switch by a player, wherein the bet rate setting device is separate from the bet number setting device;

a setting image control device configured to select a setting image from a plurality of different images depending on the bet rate set by the bet rate setting device, a different image being selected for a different bet rate;

a setting image output device configured to output the setting image selected by the setting image control device when the bet rate is set by the bet rate setting device in accordance with the operation of the bet rate setting switch by the player;

a setting sound control device configured to select a setting sound from a plurality of different sounds depending on the bet rate set by the bet rate setting device, a different sound being selected for a different bet rate;

a setting sound output device configured to output the setting sound selected by the setting sound control device when the bet rate is set by the bet rate setting device in accordance with the operation of the bet rate setting switch by the player; and a game medium insertion section configured to receive a plurality of types of gaming mediums of different values, wherein, in accordance with the operation of the bet rate setting switch by the player, the bet rate setting device sequentially changes the bet rate from a lowest rate to a highest rate and returns the bet rate to the lowest rate from the highest rate at once.

5. The gaming machine according to claim 4, further comprising:

a setting image storage device storing a setting image table, in which the bet rate and a kind of setting images are correlated to each other and which is referred to by the setting image control device; and a setting image table board on which the setting image storage device is mounted and which is detachably connected to the gaming machine.

6. The gaming machine according to claim 1, further comprising:

a game medium discrimination device configured to discriminate a value associated with a type of game medium inserted into the game medium insertion section;

an insertion sound output device configured to output an insertion sound when the value of game medium is discriminated by the game medium discrimination device; and an insertion sound control device configured to control the insertion sound to be outputted from the insertion sound output device, depending on the value of game medium discriminated by the game medium discrimination device.

7. The gaming machine according to claim 3, further comprising:

a display device provided separately from the setting image output device and configured to provide a variable display including scrolling various symbols.

8. The gaming machine according to claim 4, further comprising:

a game medium discrimination device configured to discriminate a value associated with type of game medium inserted into the game medium insertion section;

an insertion image output device configured to output an insertion image when the value of game medium is discriminated by the game medium discrimination device; and an insertion image control device configured to control the insertion image to be outputted from the insertion image output device, depending on the value of game medium discriminated by the game medium discrimination device.

9. The gaming machine according to claim 4, further comprising:

a display device provided separately from the setting image output device and configured to provide a variable display including scrolling various symbols.

* * * * *